United States Patent
Shim et al.

(10) Patent No.: US 10,162,347 B2
(45) Date of Patent: Dec. 25, 2018

(54) MOBILE TERMINAL AND METHOD FOR CONTROLLING THE SAME

(71) Applicant: LG ELECTRONICS INC., Seoul (KR)

(72) Inventors: Hongjo Shim, Seoul (KR); Gukchan Lim, Seoul (KR); Seonghyok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 463 days.

(21) Appl. No.: 14/918,407

(22) Filed: Oct. 20, 2015

(65) Prior Publication Data

US 2016/0306350 A1    Oct. 20, 2016

Related U.S. Application Data

(60) Provisional application No. 62/150,098, filed on Apr. 20, 2015.

(30) Foreign Application Priority Data

Jul. 9, 2015    (KR) .......................... 10-2015-0097920

(51) Int. Cl.
*B60R 25/04*    (2013.01)
*G05B 19/00*    (2006.01)
(Continued)

(52) U.S. Cl.
CPC ........... *G05D 1/0016* (2013.01); *B60R 25/25* (2013.01); *G06F 1/26* (2013.01); *G07C 9/00309* (2013.01);
(Continued)

(58) Field of Classification Search
CPC ...... H04B 1/3888; G05B 19/00; B60R 25/10; B60R 25/24; B60R 25/04; H04M 1/725
(Continued)

(56) References Cited

U.S. PATENT DOCUMENTS 6,525,646 B1 *  2/2003  Bartz .................... G04B 47/00
                                                    340/5.41
6,535,107 B1 *  3/2003  Bartz .................... B60R 25/24
                                                    340/5.2
(Continued)

FOREIGN PATENT DOCUMENTS

GB        2480685       11/2011
GB        2487447        7/2012
(Continued)

OTHER PUBLICATIONS

European Patent Office Application Serial No. 15003051.8, Partial Search Report dated Aug. 29, 2016, 10 pages.
(Continued)

*Primary Examiner* — Nam V Nguyen
(74) *Attorney, Agent, or Firm* — Lee, Hong, Degerman, Kang & Waimey PC

(57) ABSTRACT

A mobile terminal capable of controlling a vehicle and a method for controlling the same are provided. The mobile terminal includes a main body having a front surface, a side surface, and a rear surface, a cover configured to cover at least a portion of the front surface, the side surface, and the rear surface of the main body, a vehicle authenticating unit configured to supply power to the main body and the vehicle authenticating unit, and a control unit configured to control the power supply unit to supply power to the vehicle authenticating unit, wherein, upon receiving power from the power supply unit, the vehicle authenticating unit performs the authentication information to the vehicle to perform authentication with respect to the vehicle.

9 Claims, 30 Drawing Sheets

(51) Int. Cl.
  *B60R 25/10* (2013.01)
  *B60R 25/24* (2013.01)
  *G08B 5/22* (2006.01)
  *B60R 25/25* (2013.01)
  *G05D 1/00* (2006.01)
  *G06F 1/26* (2006.01)
  *H04L 29/06* (2006.01)
  *G07C 9/00* (2006.01)
  *H04M 1/725* (2006.01)

(52) U.S. Cl.
  CPC .......... *H04L 63/08* (2013.01); *H04M 1/7253* (2013.01); *H04M 1/72575* (2013.01)

(58) Field of Classification Search
  USPC .............................. 340/5.61, 5.64, 5.65, 5.72
  See application file for complete search history.

(56) References Cited

U.S. PATENT DOCUMENTS

| | | | | |
|---|---|---|---|---|
| 6,617,961 | B1* | 9/2003 | Janssen | B60R 25/245 |
| | | | | 307/10.1 |
| 8,525,641 | B2* | 9/2013 | Yamane | E05B 19/0082 |
| | | | | 340/5.61 |
| 8,639,291 | B1* | 1/2014 | Gailloux | H04W 52/0274 |
| | | | | 455/558 |
| 9,007,195 | B2* | 4/2015 | Ghabra | B60R 25/246 |
| | | | | 340/426.16 |
| 9,603,090 | B2* | 3/2017 | Khan | G06F 21/35 |
| 2004/0124969 | A1* | 7/2004 | Okada | B60R 25/24 |
| | | | | 340/5.72 |
| 2009/0150704 | A1 | 6/2009 | Van Bosch | |
| 2009/0291634 | A1 | 11/2009 | Saarisalo | |
| 2012/0092128 | A1 | 4/2012 | Yamane et al. | |
| 2012/0172010 | A1* | 7/2012 | Oman | G07C 5/008 |
| | | | | 455/414.1 |
| 2013/0099892 | A1 | 4/2013 | Tucker et al. | |
| 2015/0044964 | A1 | 2/2015 | Khan et al. | |
| 2015/0353051 | A1* | 12/2015 | Muller | G08C 17/02 |
| | | | | 701/2 |
| 2017/0012658 | A1* | 1/2017 | Otsubo | H04Q 9/00 |

FOREIGN PATENT DOCUMENTS

| | | |
|---|---|---|
| WO | 2014096025 | 6/2014 |
| WO | 2015001014 | 1/2015 |

OTHER PUBLICATIONS

European Patent Office Application Serial No. 15003051.8, Office Action dated Jan. 29, 2018, 8 pages.

\* cited by examiner

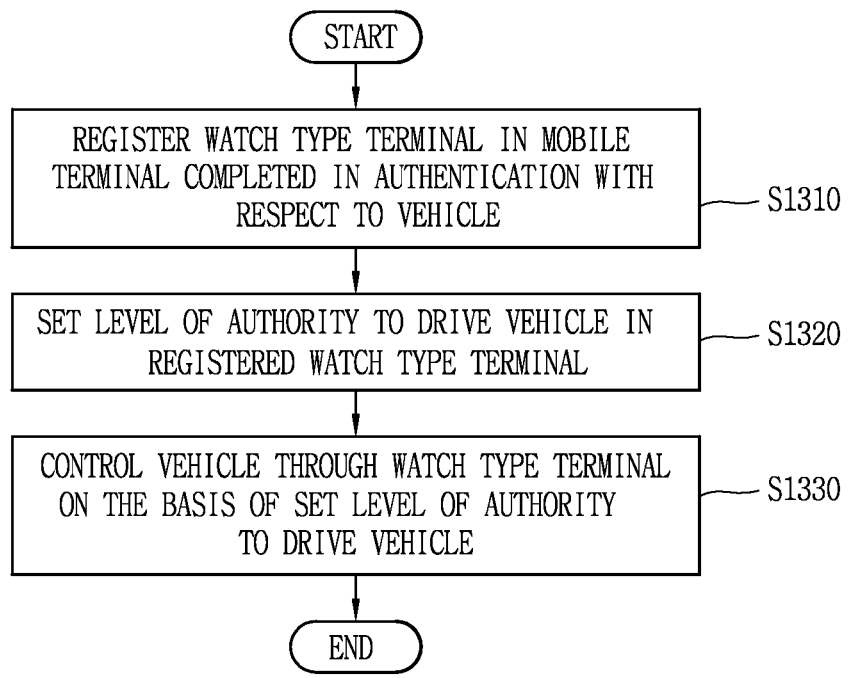

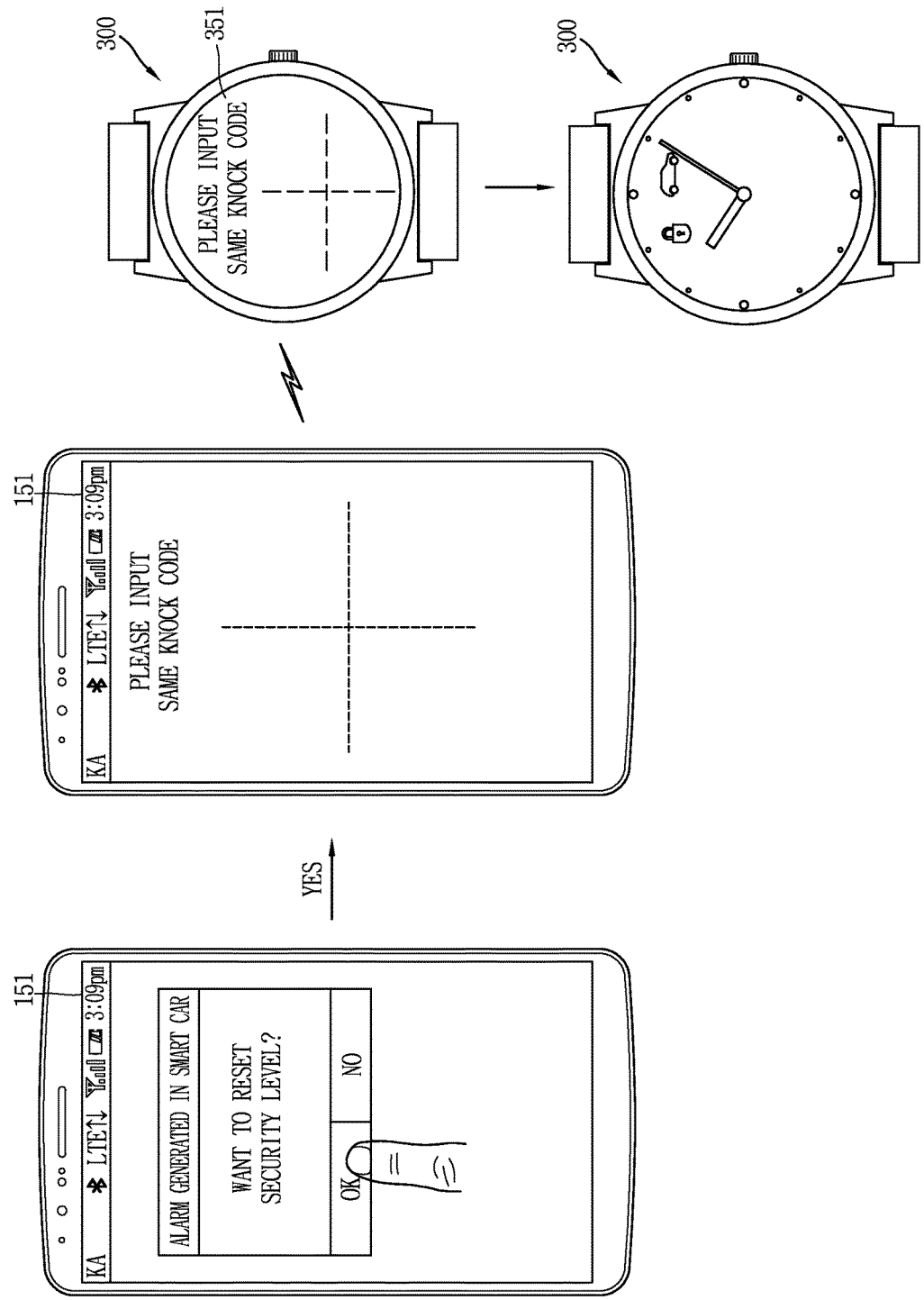

MOBILE TERMINAL AND METHOD FOR CONTROLLING THE SAME

CROSS-REFERENCE TO RELATED APPLICATION

Pursuant to 35 U.S.C. § 119, this application claims the benefit of earlier filing date and right of priority to Korean Application No. 10-2015-0097920, filed on Jul. 9, 2015, and also claims the benefit of U.S. Provisional Application No. 62/150,098, filed on Apr. 20, 2015, and the contents of which are all incorporated by references herein in their entirety.

BACKGROUND OF THE INVENTION

1. Field of the Invention

The present disclosure relates to a mobile terminal capable of controlling a vehicle and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

Recently, vehicles that can be connected to mobile terminals have been developed. Thus, demand for a method for controlling a vehicle through a mobile terminal has increased.

Meanwhile, in terms of characteristics of vehicles, users may be sensitive to security of vehicles. Thus, the present invention proposes a method for controlling a vehicle, while maintaining security of a vehicle.

SUMMARY OF THE INVENTION

Therefore, an aspect of the detailed description is to provide a mobile terminal capable of controlling a vehicle without using a separate key device for driving a vehicle.

Another aspect of the detailed description is to control a vehicle using various wearable devices.

To achieve these and other advantages and in accordance with the purpose of this specification, as embodied and broadly described herein, a mobile terminal includes: a main body having a front surface, a side surface, and a rear surface; a cover configured to cover at least a portion of the front surface, the side surface, and the rear surface of the main body; a vehicle authenticating unit configured to supply power to the main body and the vehicle authenticating unit; and a control unit configured to control the power supply unit to supply power to the vehicle authenticating unit, wherein, upon receiving power from the power supply unit, the vehicle authenticating unit performs the authentication information to the vehicle to perform authentication with respect to the vehicle.

In an exemplary embodiment of the present disclosure, the cover may include an auxiliary power supply unit configured to supply power to the vehicle authenticating unit.

In an exemplary embodiment of the present disclosure, when power of the power supply unit is equal to or smaller than a preset amount, the control unit may supply power to the vehicle authenticating unit through the auxiliary power supply unit.

In an exemplary embodiment of the present disclosure, the cover may include a receiving space configured to allow a physical key to be drawn in thereto or drawn out therefrom.

To achieve these and other advantages and in accordance with the purpose of this specification, as embodied and broadly described herein, a mobile terminal includes: a vehicle authenticating unit configured to transmit first authentication information to a vehicle in response to a preset wireless signal received from the vehicle in order to perform key authentication of the vehicle; a short range communication unit configured to perform communication with the vehicle; and a control unit configured to control the vehicle authenticating unit to transmit the first authentication information to the vehicle, and transmit second authentication information to the vehicle through the short range communication unit after the transmission of the first authentication information to the vehicle, wherein when authentication with respect to the vehicle is successful on the basis of the first authentication information and the second authentication information, the control unit executes a function related to the vehicle.

In an exemplary embodiment of the present disclosure, in a case in which authentication based on at least one of the first authentication information and the second authentication information fails, the control unit may limit execution of the function related to the vehicle.

In an exemplary embodiment of the present disclosure, in a case in which authentication based on any one of the first authentication information and the second authentication information fails, the control unit may execute an additional authentication function to allow the user to input third authentication information to execute a function related to the vehicle.

In an exemplary embodiment of the present disclosure, the third authentication information may be at least one of biometric information, password information, and code information of the user.

In an exemplary embodiment of the present disclosure, the mobile terminal may further include: a near-field communication (NFC) unit configured to perform communication in an NFC manner, wherein the control unit may transmit the third authentication information to the vehicle through the NFC unit.

In an exemplary embodiment of the present disclosure, when the additional authentication function is not executed, the control unit may limit execution of the function related to the vehicle.

In an exemplary embodiment of the present disclosure, in response to a preset wireless signal transmitted from the vehicle, the control unit may control the vehicle authenticating unit to transmit the first authentication information to the vehicle.

To achieve these and other advantages and in accordance with the purpose of this specification, as embodied and broadly described herein, a mobile terminal includes: a vehicle authenticating unit configured to transmit first authentication information for performing key authentication of a vehicle in response to a preset wireless signal transmitted from the vehicle; a short range communication unit configured to perform short range communication with the vehicle; and a control unit configured to control the vehicle authenticating unit to transmit the first authentication information to the vehicle, and transmit second authentication information through the NFC unit, after the transmission of the first authentication information, to perform authentication with respect to the vehicle, wherein when authentication with respect to the vehicle on the basis of the first authentication information and the second authentication information is successful, the control unit determines any one of a plurality of security levels having different authority to drive the vehicle on the basis of a preset condition, and control the vehicle according to the determined any one security level.

In an exemplary embodiment of the present disclosure, the preset condition may be a condition related to at least one of identification information of the mobile terminal and location information of the mobile terminal.

In an exemplary embodiment of the present disclosure, when a location of the mobile terminal corresponds to a previously stored location, the control unit may control the vehicle with a first security level, and when a location of the mobile terminal does not correspond to the previously stored location, the control unit may control the vehicle with a second security level having authority to drive the vehicle lower than that of the first security level.

In an exemplary embodiment of the present disclosure, when a user request for executing a function not available to be executed in the any one security level is received, the control unit may output notification information for changing the security level.

In an exemplary embodiment of the present disclosure, the control unit may transmit information related to authority to drive the vehicle to an external device such that the external device has the any one security level or a security level having authority to drive lower than that of the any one security level.

In an exemplary embodiment of the present disclosure, when security information received from the user and security level received from the external device are identical, the control unit may transmit information related to authority to drive the vehicle to the external device such that the external device has the any one security level or a security level having authority to drive lower than that of the any one security level.

To achieve these and other advantages and in accordance with the purpose of this specification, as embodied and broadly described herein, a watch type terminal includes: a main body configured to have a display unit; a band unit configured to be detachably attached to the main body; a vehicle authenticating unit installed in the band unit and configured to transmit authentication information for key authentication of a vehicle to the vehicle in response to a preset wireless signal received from the vehicle; a power supply unit configured to supply power to the main body and the vehicle authenticating unit; and a control unit configured to control the power supply unit to supply power to the vehicle authenticating unit, wherein, upon receiving power from the power supply unit, the vehicle authenticating unit transmits the authentication information to the vehicle to perform authentication with respect to the vehicle.

In an exemplary embodiment of the present disclosure, the watch type terminal may further include a plurality of connection terminals configured to receive power from the power supply unit.

In an exemplary embodiment of the present disclosure, when power is supplied to the vehicle authenticating unit, the control unit may control the vehicle authenticating unit to transmit authentication information for key authentication of the vehicle to the vehicle.

In an exemplary embodiment of the present disclosure, after the authentication information is transmitted from the vehicle authenticating unit, the control unit may transmit authentication information, different from the authentication information, to the vehicle, for dual authentication.

To achieve these and other advantages and in accordance with the purpose of this specification, as embodied and broadly described herein, a watch type terminal includes: a short range communication unit configured to perform communication with a mobile terminal and a vehicle; and a control unit configured to obtain authority to drive a vehicle through data communication with the mobile terminal, wherein the control unit transmits security information to the mobile terminal to obtain authority to drive the vehicle, receives information related to authority to drive the vehicle from the mobile terminal, and control the vehicle on the basis of the information related to the authority to drive.

In an exemplary embodiment of the present disclosure, the control unit may determine any one of a plurality of security levels having different authority to drive on the basis of the information related to authority to drive of the vehicle, and controls the vehicle according to the determined any one security level.

In an exemplary embodiment of the present disclosure, after the any one security level is set, when a user request for executing a function not available to be executed in the any one security level is received, the control unit may transmit notification information indicating that the user request has been received, to the mobile terminal.

In an exemplary embodiment of the present disclosure, when the user request is sensed by a preset number of times or greater, the control unit may transmit the notification information.

In an exemplary embodiment of the present disclosure, the function not available to be executed may be a function of starting the vehicle or a payment function.

In an exemplary embodiment of the present disclosure, the control unit may control the preset mobile terminal to execute a function not available to be executed in the any one security level.

In an exemplary embodiment of the present disclosure, the watch type terminal may further include: a display unit, wherein when information related to authority to drive the vehicle is received, the control unit may display a graphic object representing information related to the authority to drive the vehicle on the display unit.

In an exemplary embodiment of the present disclosure, when a vehicle is sensed within a preset radius, the control unit may display a distance between the vehicle and the watch type terminal on the display unit.

In an exemplary embodiment of the present disclosure, when the distance between the vehicle and the watch type terminal is within a preset distance, the control unit may make the distance between the vehicle and the watch type terminal disappear from the display unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 13 is a flow chart illustrating a method for performing control related to a vehicle by using a watch type terminal.

FIGS. 16A and 16B are conceptual views illustrating a vehicle through an authentication-completed watch type terminal.

DETAILED DESCRIPTION OF THE INVENTION

Figure 1A:
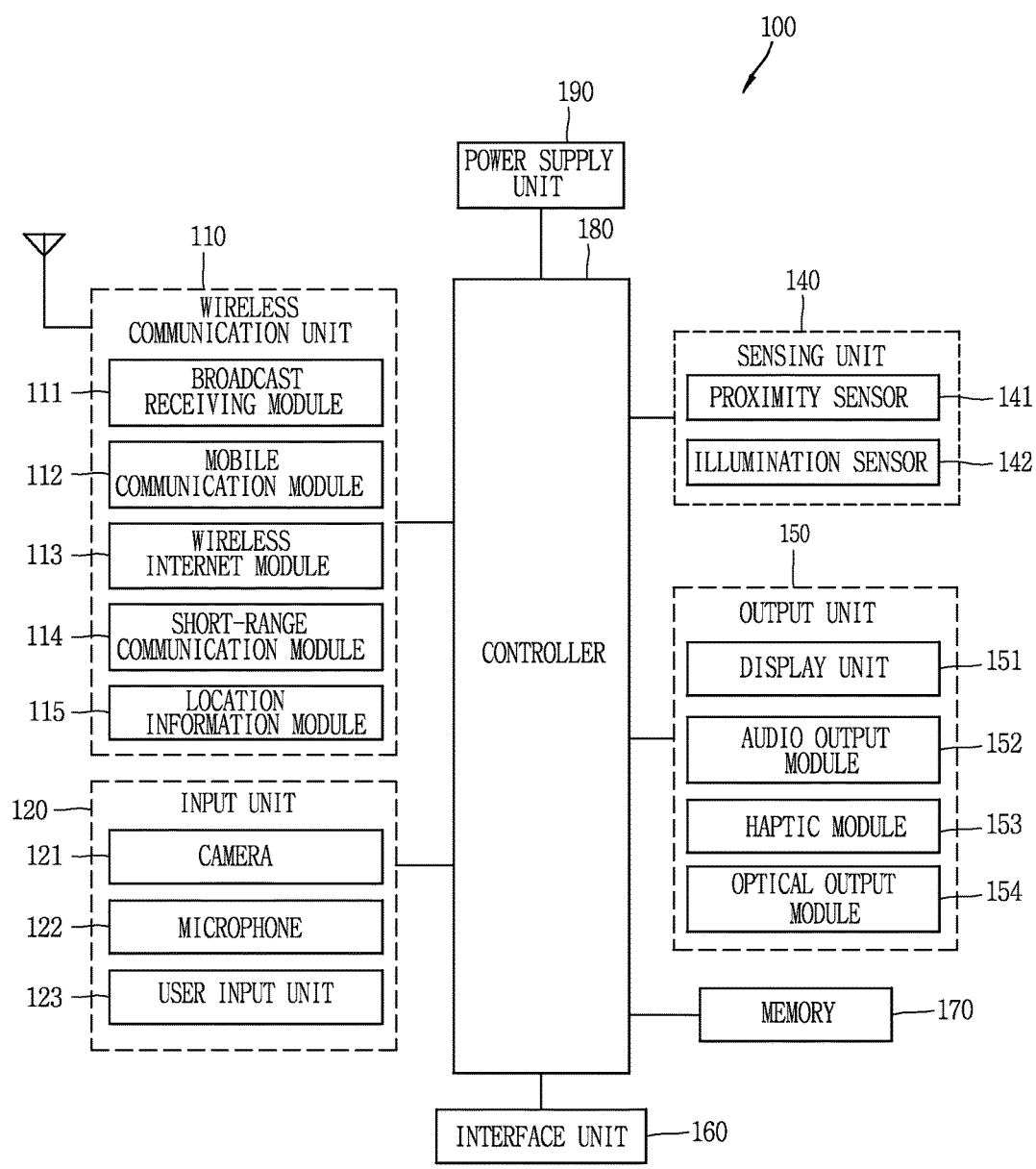
FIG. 1A is a block diagram illustrating a mobile terminal according to the present invention.

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings. In the following description, explanations will be made in order in the clockwise direction based on the drawing in a right upper side.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
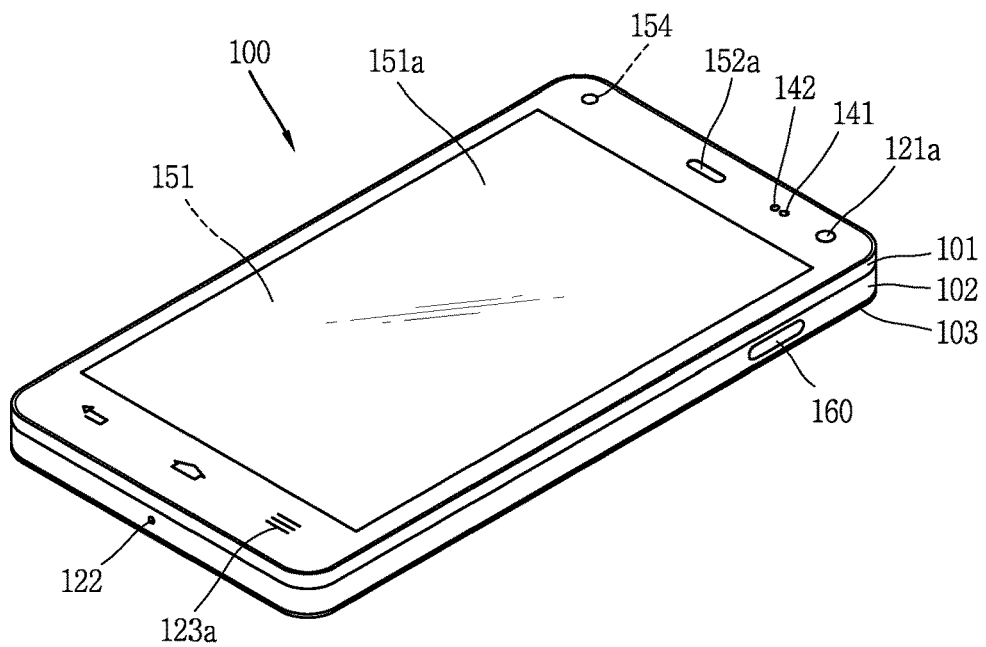
FIGS. 1B and 1C are conceptual views illustrating an example of a mobile terminal, viewed from different directions according to the present invention.
Figure 1C:
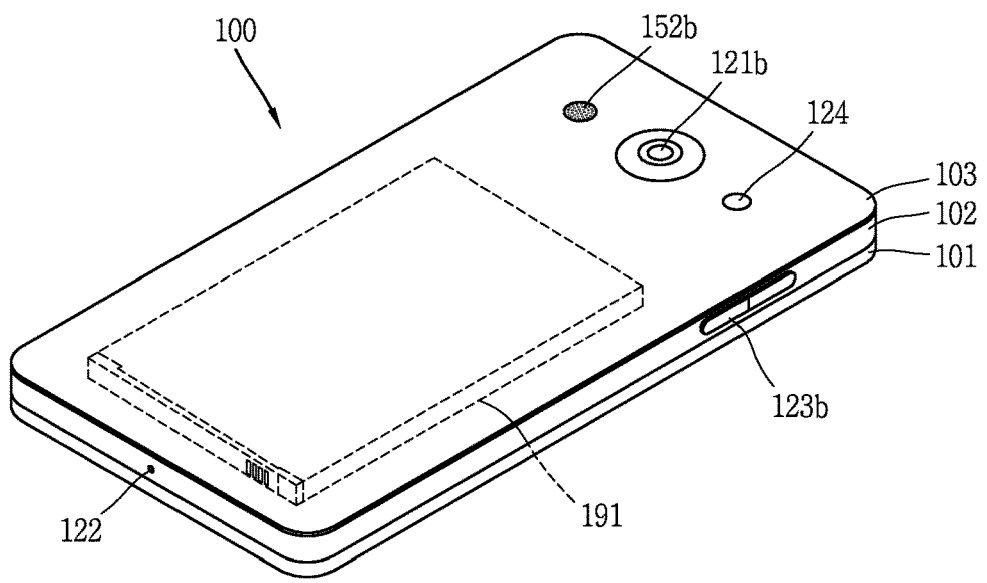

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include the display unit 151, the first audio output module 152a, the second audio output module 152b, the proximity sensor 141, the illumination sensor 142, the optical output module 154, the first camera 121a, the second camera 121b, the first manipulation unit 123a, the second manipulation unit 123b, the microphone 122, the interface unit 160, etc.

Hereinafter, the mobile terminal 100 will be explained with reference to FIGS. 1B and 1B. The display unit 151, the first audio output module 152a, the proximity sensor 141, the illumination sensor 142, the optical output module 154, the first camera 121a and the first manipulation unit 123a are arranged on the front surface of the terminal body. The second manipulation unit 123b, the microphone 122 and the interface unit 160 are arranged on the side surfaces of the terminal body. The second audio output module 152b and the second camera 121b are arranged on the rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. For example, the display unit 151 may display information on an execution screen of an application program driven in the mobile terminal 100, or a User Interface (UI) or a Graphic User Interface (GUI) associated with such execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output unit 152a may be implemented as a receiver for transmitting a call sound to a user's ears, and the second audio output unit 152b may be implemented as a loud speaker for outputting each type of alarm sounds or a play sound of multimedia.

It may be configured such that the sounds generated from the first audio output module 152a are released along an assembly gap between the structural bodies (e.g., between the window 151a and the front case 101). In this case, a hole independently formed to output audio sounds may not be seen or hidden in terms of appearance, thereby further simplifying the appearance of the mobile terminal 100.

The optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented in such a manner that the mobile terminal emits monochromatic light or light with a plurality of colors. The signal output may be terminated as the mobile terminal senses that a user has checked the generated event, for example.

The first camera 121a processes image data of still pictures or video acquired by an image capture device in a video capturing mode or an image capturing mode. The processed image frames may be displayed on the display unit 151, or may be stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

Hereinafter, a communication system which is operable with the mobile terminal 100 according to the present disclosure will be described.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

A CDMA wireless communication system is shown having a plurality of mobile terminals 100, a plurality of base stations (BSs), base station controllers (BSCs), and a mobile switching center (MSC). The MSC is configured to interface with a conventional Public Switch Telephone Network (PSTN). The MSC is also configured to interface with the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 (FIG. 1A) is typically configured inside the mobile terminal 100 to receive broadcast signals transmitted by the BT.

Global Positioning System (GPS) satellites 300 facilitate locating the position of at least one of plural mobile terminals 100. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short Hereinafter, exemplary embodiments related to a control method that may be realized in the mobile terminal configured described above will be described with reference to the accompanying drawings. It will be obvious by a person skilled in the art that the present invention is embodied to any other forms without departing from the sprit and scope of the present invention.

Figure 2:
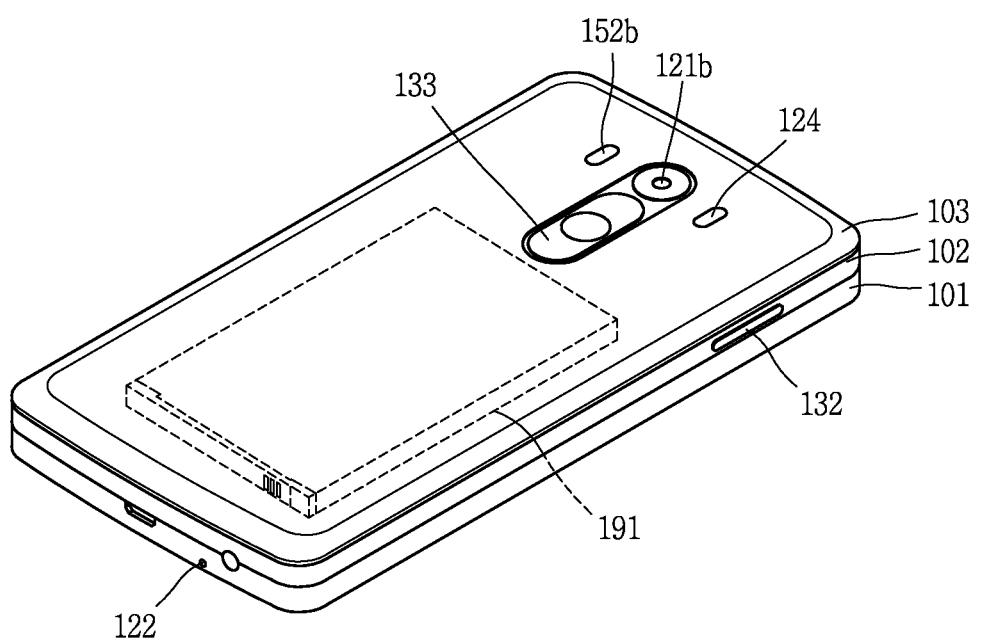
FIG. 2 is a conceptual view illustrating another exemplary embodiment of a mobile terminal according to the present disclosure.

FIG. 2 is a conceptual view illustrating another exemplary embodiment of a mobile terminal according to the present disclosure.

Referring to FIG. 2, the mobile terminal may further include a user input unit 133 provided on a rear surface of the main body thereof. A control command regarding the display unit 151 is received through the rear input unit 133. In detail, when a push input is applied to a button of the rear input unit 133, the display unit 151 is switched to an activated state. That is, the rear input unit 133 may be a power key for turning on or off the display unit 151. Thus, the mobile terminal may also be turned on or off by the button.

In the following drawings, the same reference numerals will be used for the same components and described. Also, drawings will be described in a clockwise direction, starting from the drawing on the upper left portion as a reference.

The mobile terminal according to an exemplary embodiment of the present disclosure may include a vehicle authenticating unit performing key authentication of a vehicle, and may obtain authority to drive a vehicle. Here, the vehicle authenticating unit may be integrally formed with the mobile terminal or may be formed in a detachable cover of the mobile terminal. Hereinafter, disposition of each vehicle authenticating unit will be described with reference to the accompanying drawings.

Figure 3A:
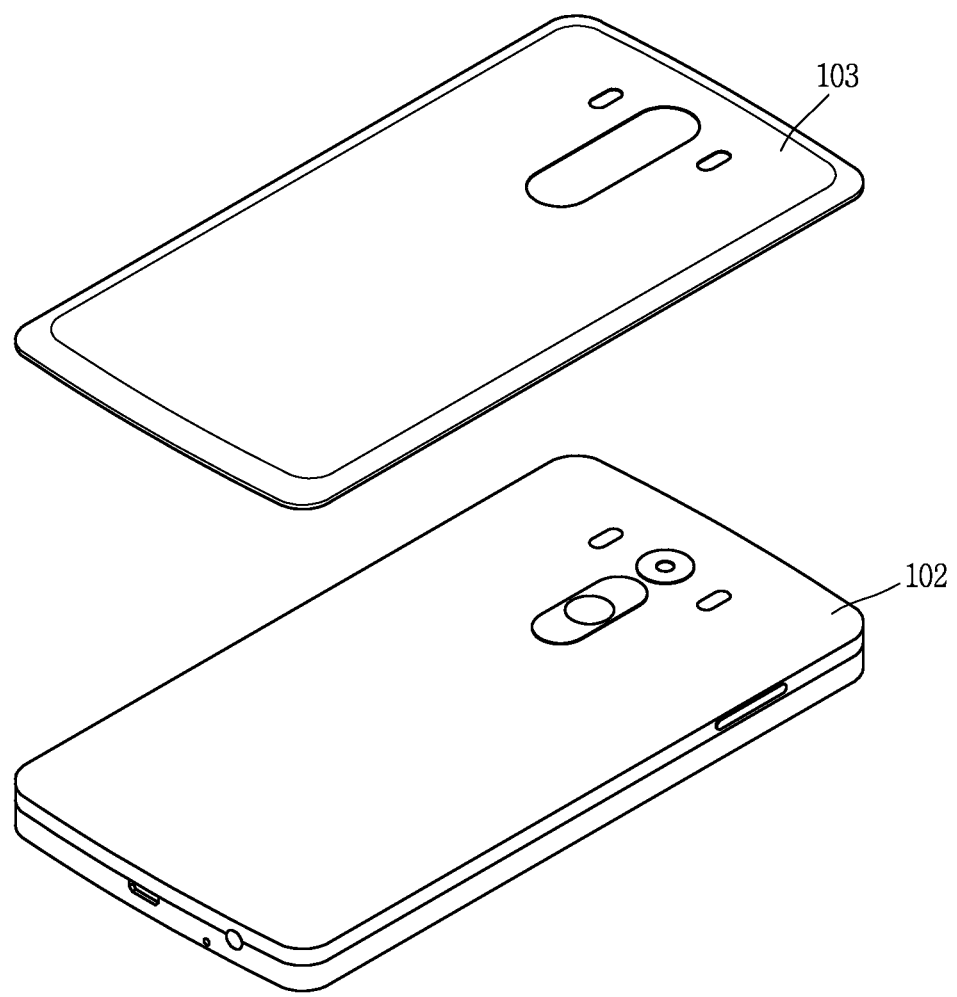
FIGS. 3A, 3B, and 3C are conceptual views illustrating a vehicle authenticating unit provided in a rear cover of a mobile terminal according to an exemplary embodiment of the present disclosure.
Figure 3B:
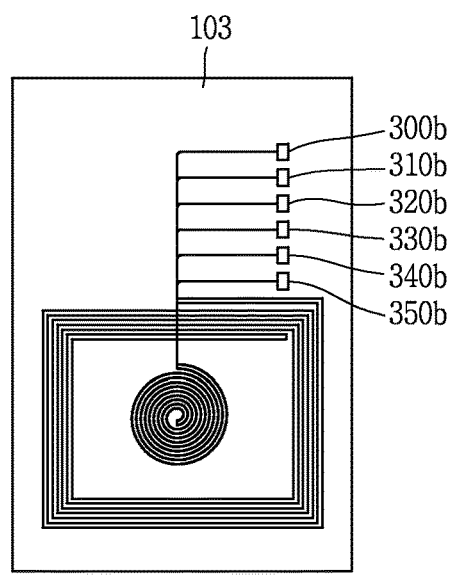
Figure 3C:
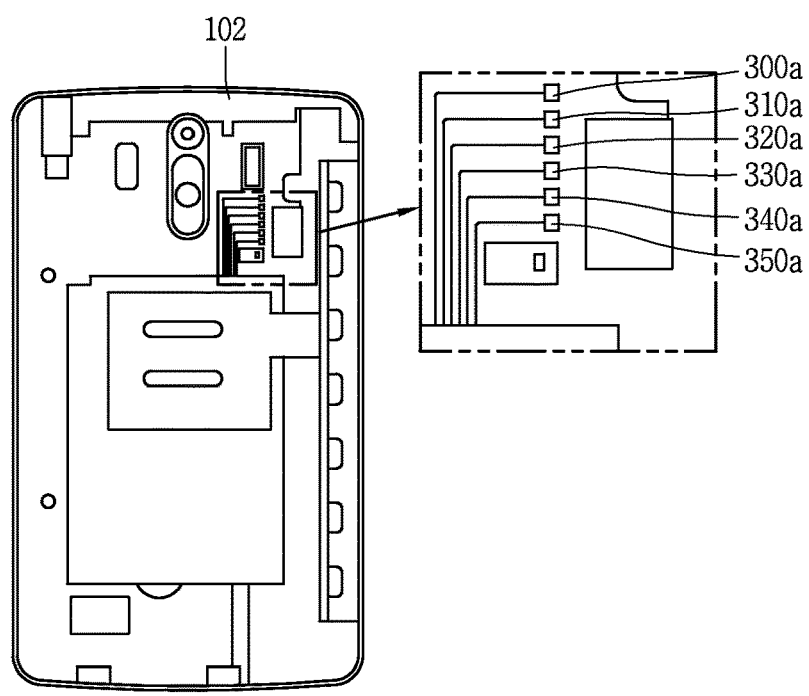

First, a mobile terminal in which a vehicle authenticating unit performing key authentication of a vehicle is provided on a rear cover will be described. FIGS. 3A, 3B, and 3C are conceptual views illustrating a vehicle authenticating unit provided in a rear cover of a mobile terminal according to an exemplary embodiment of the present disclosure.

First, the mobile terminal according to an exemplary embodiment of the present disclosure may include at least one of a main body 100 having a front surface, a rear surface, and a side surface, a cover formed to cover at least a portion of the main body 100, a wireless communication unit 110, a control unit 180, and a vehicle authenticating unit.

At least one electronic component may be installed in the main body 100. For example, electronic components such as a battery, an identification module, and a memory card may be installed on the rear surface of the main body 100 (that is, on the rear case 102).

The cover may be formed to cover at east a portion of the main body 100. For example, the cover may be at least one of a front cover coupled to the front surface of the main body 100, a rear cover coupled to the rear surface, and a side cover coupled to the side surface. For example, as illustrated in FIG. 3A, the rear cover 103 may be formed to cover at least a portion of the rear surface of the main body 100. Here, the rear cover 103 may further include an opening exposing an electronic component such as a microphone or a camera to be exposed outwardly. Hereinafter, in the present disclosure, the rear cover 103 is described as an example, but the cover formed to cover at least a portion of the front surface and the side surface may also be formed in the same manner.

Meanwhile, the rear cover 103 according to an exemplary embodiment of the present disclosure may include at least one of a vehicle authenticating unit formed to transmit authentication information for performing key authentication of a vehicle to a vehicle, a wireless charging unit for performing charging wirelessly, and a near field communication (NFC) unit for performing NFC communication.

The vehicle authenticating unit may further include an antenna for communicating with an external device (a vehicle or a mobile terminal). Here, the antenna of the vehicle authenticating unit may be formed to perform communication with the external device according to short range communication scheme of a frequency band of 433.92 MHz.

The wireless charging unit may receive electric power wirelessly and supply electric power to vehicle authenticating unit and the mobile terminal. In order to receive electric power wirelessly, the wireless charging unit may include a coil for converting a magnetic field received from a charger into a current. The coil of the wireless charging unit may receive electric power using a resonance frequency having a band of 6.78 MHz.

The NFC communication unit may perform NFC with a vehicle according to a short range communication scheme. The NFC communication unit may include an NFC antenna performing communication with an external device according to a short range communication scheme at a frequency band of 13.56 MHz. The NFC antenna may follow an NFC communication standard and may be wound to have a rectangular shape.

On the rear cover 103, coils (or antennas) constituting the vehicle authenticating unit, the wireless charging unit, and the NFC communication unit may be disposed to be coplanar and adjacent to each other. For example, as illustrated in FIG. 3B, a rectangular NFC antenna having an empty internal space and forming the NFC communication unit, a coil of the wireless charging unit wound in a circular shape having an empty interior and disposed within the NFC antenna, and a coil of a vehicle authenticating unit disposed within the coil of the wireless charging unit may be disposed to be adjacent to each other on the same plane of the rear cover.

Meanwhile, in order to prevent vehicle theft, the vehicle authenticating unit may transmit authentication information to be transmitted to a vehicle, to the vehicle. The vehicle authenticating unit transmitting authentication information of the vehicle may include an immobilizer module storing the authentication information of the vehicle. The authentication information may include a preset password code (or password information) for security of the vehicle.

In response to a preset wireless signal received from the vehicle, the vehicle authenticating unit may transmit authentication information to the vehicle. In detail, when a preset wireless signal is received from the vehicle, the vehicle authenticating unit may transmit authentication information stored in the immobilizer module to the vehicle by using electric power included in the wireless signal.

Also, after the vehicle authenticating unit receives power from the power supply unit of the mobile terminal, when a preset wireless signal is received from the vehicle, the vehicle authenticating unit may transmit authentication information to the vehicle.

Upon receiving the authentication information, the vehicle determines whether the authentication information is identical to preset authentication information. When the authentication information is identical to preset authentication information, the vehicle may be started. Conversely, when authentication information is not identical to preset authentication information, starting of the vehicle may be limited.

Also, the vehicle authenticating unit may receive power from at least one of the power supply unit 190 of the mobile terminal and an auxiliary power supply unit provided in the rear cover 103.

In order to receive electric power from the power supply unit 190 of the mobile terminal, a plurality of connection terminals 300b, 310b, 320b, 330b, 340b, and 350b may be installed in the rear cover 103.

The plurality of connection terminals 300b, 310b, 320b, 330b, 340b, and 350b may be disposed in a region in contact with a plurality of connection terminals 300a, 310a, 320a, 330a, 340a, and 350a installed in the rear surface 102 of the main body 100 of the mobile terminal.

The plurality of connection terminals 300b, 310b, 320b, 330b, 340b, and 350b may include connection terminals 300b, 310b, and 320b for data communication between the vehicle authenticating unit and the control unit 180 of the mobile terminal and connection terminals 330b, 340b, and 350b for supplying power between the vehicle authenticating unit and the power supply unit 190 of the mobile terminal.

Here, the connection terminals 300b, 310b, and 320b for data communication between the vehicle authenticating unit and the control unit 180 of the mobile terminal may also be used as connection terminals for data communication between the NFC communication unit and the control unit 180. That is, in an exemplary embodiment of the present disclosure, the connection terminals 300b, 310b, and 320b for data communication between the vehicle authenticating unit and the control unit 180 of the mobile terminal may be commonly used for data communication between the NFC communication unit and the control unit 180 or connection terminals for data communication between the NFC communication unit and the control unit 180 may be separately provided.

Meanwhile, as illustrated in FIG. 3C, the plurality of connection terminals 300a, 310a, 320a, 330a, 340a, and 350a for performing communication with the vehicle authenticating unit included in the rear cover 103 or supplying power to the vehicle authenticating unit may be installed on the rear surface (or the rear case) 102 of the main body 100.

Like in the rear cover, the plurality of connection terminals 300a, 310a, 320a, 330a, 340a, and 350a may include connection terminals 300a, 310a, and 320a for data communication between the vehicle authenticating unit and the control unit 180 of the mobile terminal and connection terminals 330a, 340a, and 350a for supplying power between the vehicle authenticating unit and the power supply unit 190 of the mobile terminal.

In a case in which an amount of power remaining in the power supply unit 190 is equal to or smaller than a preset amount, the control unit 180 may limit execution of at least one function installed in the mobile terminal in order to secure power to be supplied to the rear cover 103. For example, in a case in which an amount of power remaining in the power supply unit 190 is equal to or smaller than a preset amount, the control unit 180 may limit execution of every function installed in the mobile terminal. In this manner, in an exemplary embodiment of the present disclosure, a situation in which a vehicle cannot be controlled due to shortage of power of the mobile terminal may be prevented.

Also, an auxiliary power supply unit may be further installed in the rear cover, separately from the power supply unit 190 of the mobile terminal. The auxiliary power supply unit may be provided to supply power to the vehicle authenticating unit.

The auxiliary power supply unit may be provided to supply power to the vehicle authenticating unit, in a case in which the power supply unit 190 of the mobile terminal cannot supply power to the vehicle authenticating unit. Thus, even in a case in which there is no power in the power supply unit 190 of the mobile terminal, the user may supply power by using the auxiliary power supply unit to control the vehicle.

Alternatively, in a case in which power remaining in the power supply unit 190 is equal to or smaller than a preset value, the auxiliary power supply unit may supply power to the vehicle authenticating unit. In a case in which power remaining in the power supply unit 190 of the mobile terminal is equal to or smaller than the preset value, the power supply unit 190 may stop supplying power to the vehicle authenticating unit.

Hereinbefore, the configuration in which the vehicle authenticating unit is disposed in the rear cover has been described.

Figure 4:
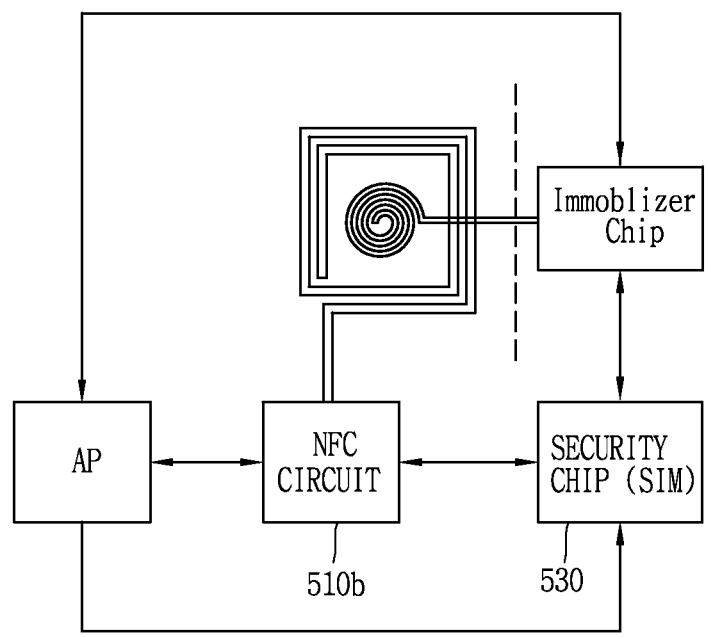
FIGS. 4 and 5 are conceptual views illustrating operations when a vehicle authenticating unit is provided in an identification module of a mobile terminal according to an exemplary embodiment of the present disclosure.
Figure 5:
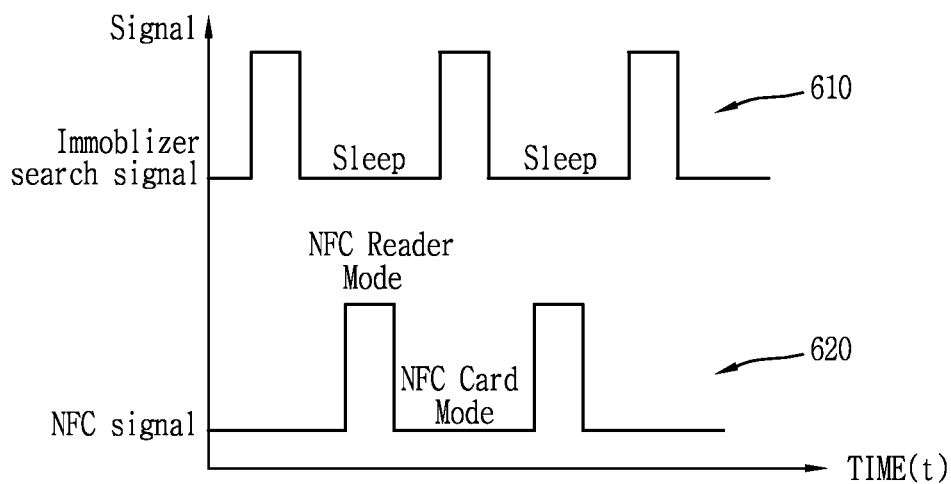

Hereinafter, a method for disposing the vehicle authenticating unit performing key authentication of a vehicle in an identification module of a mobile terminal will be described. FIGS. 4 and 5 are conceptual views illustrating operations when a vehicle authenticating unit is provided in an identification module of a mobile terminal according to an exemplary embodiment of the present disclosure.

In the mobile terminal according to an exemplary embodiment of the present disclosure, an identification module may be installed on the rear surface of the main body 100. The identification module, a chip storing various types of information for authenticating authority to use the mobile terminal, may include a user identity module (UIM), a subscriber identity module (SIM), or a universal subscriber identity module (USIM). A device (hereinafter, referred to as an "identification device") including the identification module may be manufactured in the form of a smart card.

An NFC communication unit performing communication with an external device according to an NFC communication scheme and a vehicle authenticating unit may be installed in the identification module.

For example, as illustrated in FIG. 4, a rectangular NFC antenna 510*a* having an empty space therein and performing NFC communication, a coil 520*a* disposed within the NFC antenna 510*a* and provided to perform communication with a vehicle, an immobilizer module (or an immobilizer chip) 520*b* connected to the coil 520*a* formed to perform communication with a vehicle and storing authentication information for key authentication of the vehicle, an NFC module 510*b* (or an NFC circuit) connected to the NFC antenna 510*a*, a security module (or a security chip) 530 (for example, a logical medium embedded in the mobile terminal such as an embedded secure element) connected to the NFC communication unit and storing security information, and an application processor (AP) controlling the NFC chip 510*b* may be installed in the identification module. Here, data may be exchanged between the NFC module 510*b* and the security module 530 and between the immobilizer module 520*b* and the security module 530 on the basis of a single wire protocol (SWP). The SWP may refer to a standard for connecting the security chip 530 and the NFC circuit through a single wire.

Meanwhile, in the present disclosure, in a case in which the vehicle authenticating unit and the NFC communication unit are disposed together in the identification module, a signal detection point in time may be controlled in order to avoid signal interference between the vehicle authenticating unit and the NFC communication unit.

For example, as illustrated in FIG. 5, the control unit 180 may differentiate a detection point in time of a first mode 610 in which authentication information is detected and a detection point in time of a second mode 620 in which an NFC signal is detected. In detail, in the second mode 620, a signal from an NFC reader mode and a signal from an NFC card mode may be alternately switched. Also, in the first mode 610, an authentication information detection mode and an authentication information non-detection mode may be alternately switched.

Hereinbefore, the case in which the vehicle authenticating unit is included in the identification module has been described.

Figure 6:
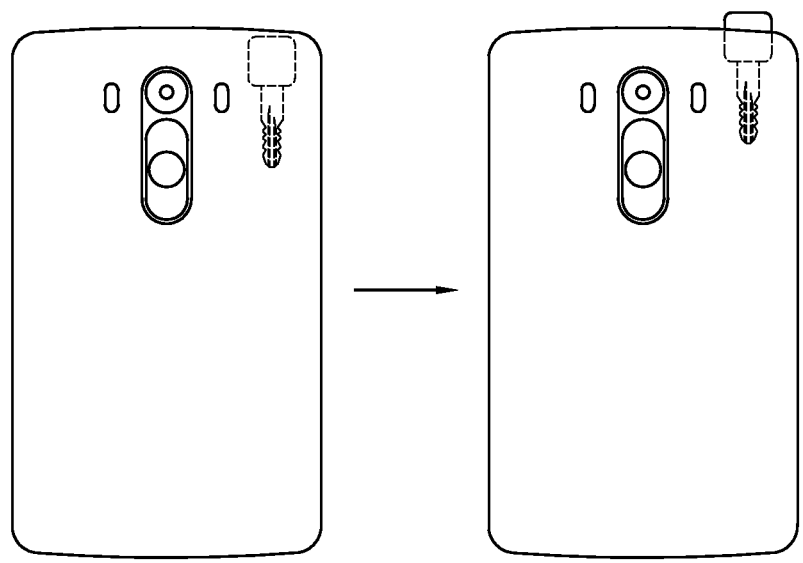
FIG. 6 is a conceptual view illustrating an example in which a physical key is installed on a rear cover of a mobile terminal.

Hereinafter, a case in which a physical key is provided on the cover of the mobile terminal will be described. FIG. 6 is a conceptual view illustrating an example in which a physical key is installed on a rear cover of a mobile terminal.

The mobile terminal according to an exemplary embodiment of the present disclosure may control a vehicle even without a smart key of the vehicle. That is, the user may carry only the mobile terminal, without carrying a smart key of the vehicle.

In this case, if the user cannot operate the mobile terminal, the user may not be able to control the vehicle. For example, when there is no power in the mobile terminal or when the mobile terminal is broken down, the user cannot control the vehicle.

Thus, in an exemplary embodiment of the present disclosure, a physical key (or a vehicle key, a hard key, or a mechanical key) of the vehicle may be installed in the rear cover 103 of the mobile terminal. In detail, the rear cover 103 may include a receiving space allowing the physical key to be drawn in thereto or drawn out therefrom. For example, as illustrated in FIG. 6, the rear cover 103 may have a receiving space in a region thereof. Thus, the user may keep a physical key in storage within the receiving space, and when necessary, the user may control the vehicle using the physical key.

Meanwhile, in the drawing, the case in which the receiving space is provided in the rear cover is illustrated, but the receiving space may also be included in the main body 100 of the mobile terminal.

Hereinbefore, the method for keeping a physical key of a vehicle in storage on the mobile terminal has been described.

Figure 7:
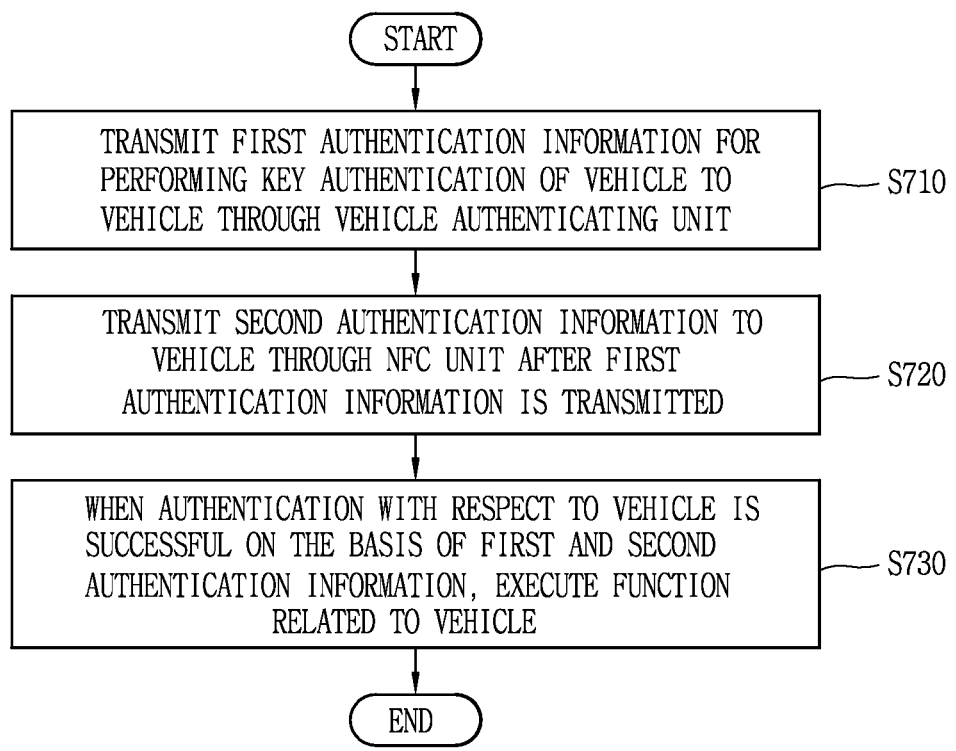
FIG. 7 is a flow chart illustrating a control method of executing a function related to a vehicle in a mobile terminal.
Figure 8A:
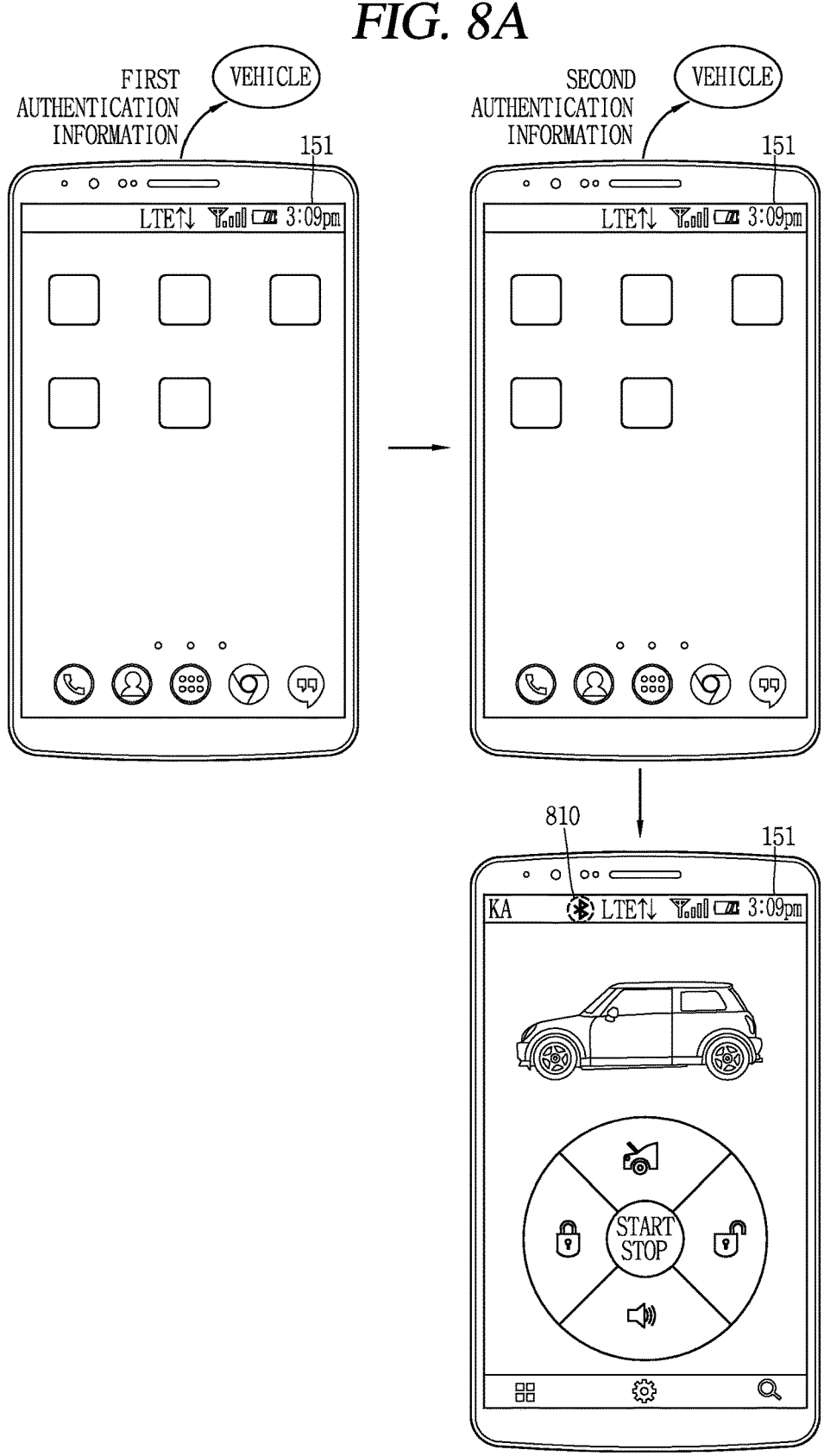
FIGS. 8A and 8B are conceptual views illustrating the control method of FIG. 7.
Figure 8B:
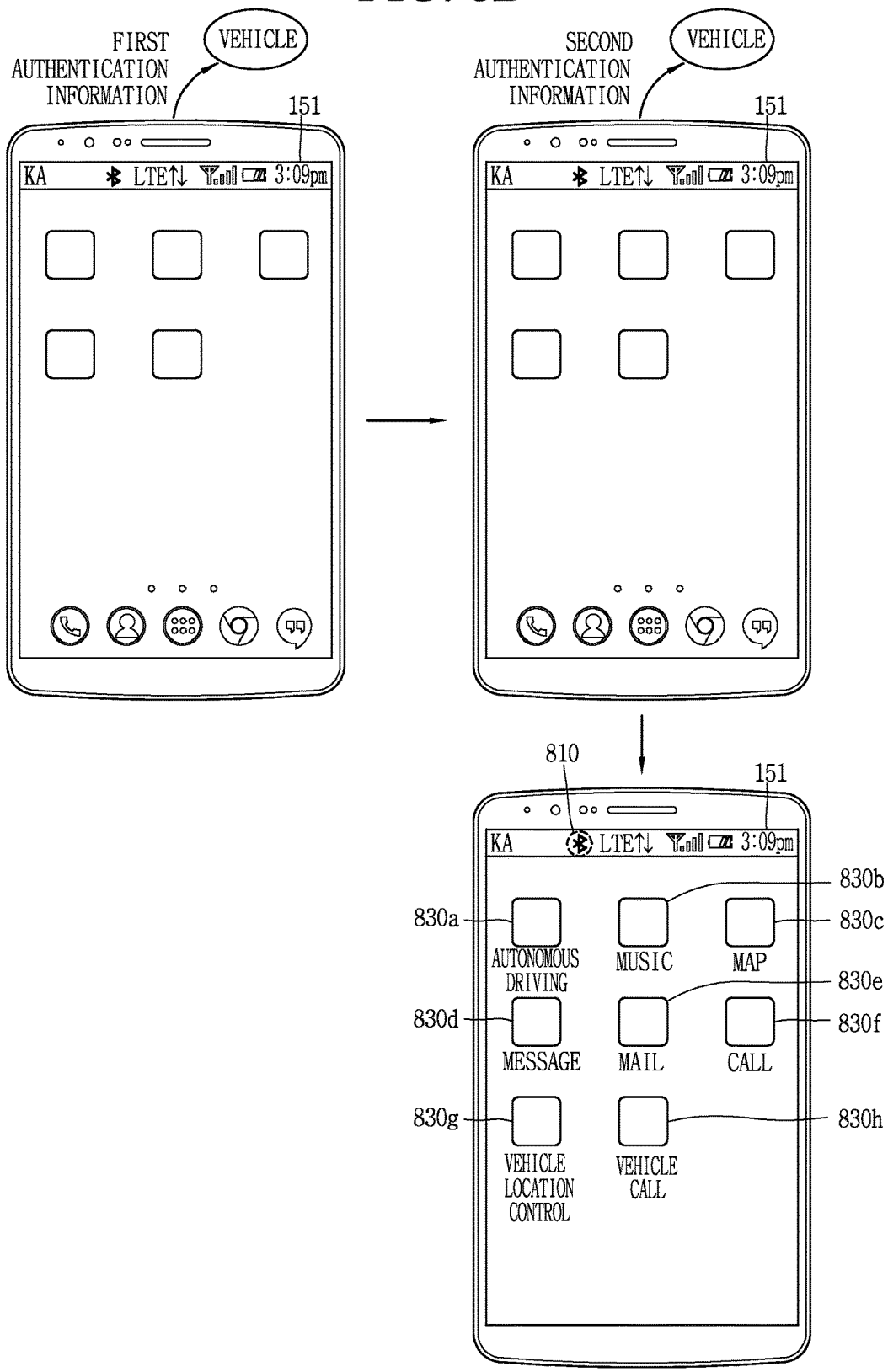

Hereinafter, a method for controlling a vehicle through a mobile terminal including a vehicle authenticating unit will be described. FIG. 7 is a flow chart illustrating a control method of executing a function related to a vehicle in a mobile terminal, and FIGS. 8A and 8B are conceptual views illustrating the control method of FIG. 7.

The mobile terminal according to an exemplary embodiment of the present disclosure may include a vehicle authenticating unit provided to transmit authentication information for performing key authentication of a vehicle. As described above, the vehicle authenticating unit may be installed on the rear cover 103 or the identification module or may be embedded in the main body 100 of the mobile terminal. Thus, the user may transmit authentication information for performing key authentication of the vehicle to the vehicle, to thereby release security set in the vehicle and obtain authority to drive the vehicle. Hereinafter, a method for obtaining authority to drive the vehicle will be described.

First, the control unit 180 of the mobile terminal according to an exemplary embodiment of the present disclosure may transmit first authentication information for performing key authentication of the vehicle to the vehicle through the vehicle authenticating unit in step S710.

When a preset wireless signal is received from the vehicle, the vehicle authenticating unit may receive electric power through the preset wireless signal. Also, in response to the preset wireless signal received from the vehicle, the vehicle authenticating unit may transmit first authentication information to the vehicle.

In detail, in order to obtain authority to drive the vehicle, the control unit 180 may control the vehicle authenticating unit to transmit the first authentication information to the vehicle. The first authentication information used for security of the vehicle may be a password code (or password information) stored in the immobilizer module.

The vehicle may store the password code (or password information) in the security module in advance. The password code (or password information) may be set stored in advance when the vehicle is released from a factory, or may be set directly by a user and stored in the security module.

When the first authentication information is received, the vehicle may determine whether the first authentication information is identical to the password code stored in the security module. When it is determined that the first authentication information is identical to the password code stored in the security module, the vehicle may be set to a driving available state. Conversely, when the first authentication information is not identical to the password code stored in the security module, the vehicle may be set to a driving unavailable state.

Meanwhile, after the first authentication information is transmitted, the control unit 180 may transmit second authentication information to the vehicle through the short range communication unit in step S720.

When the first authentication information is transmitted, the control unit 180 may perform data communication through the short range communication unit to obtain authority to drive the vehicle. To this end, when it is sensed (or determined) that the first authentication information has been transmitted, the control unit 180 may determine whether the short range communication unit has been activated.

The short range communication unit may be formed to perform short range communication. The short range communication unit may perform communication according to various communication schemes. For example, the short range communication unit may perform communication according to a Bluetooth communication scheme.

Activation of the short range communication unit may refer to a state in which communication can be performed through the short range communication unit. Conversely, deactivation of the short range communication unit may refer to a state in which communication cannot be performed through the short range communication unit.

When it is determined that the short range communication unit is in a deactivated state, the control unit 180 may switch the short range communication unit to an activated state.

When it is determined that the short range communication unit is in an activated state, the control unit 180 may transmit second authentication information through the short range communication unit. The second authentication information may be identification information of the mobile terminal. For example, the second information may be a pin code, an international mobile station identity (IMSI), a temporary mobile subscriber identity (TMSI), a mobile identification number (MIN), a mobile station international ISDN number (MSISDN), or an international mobile equipment identity (IMEI) of the mobile terminal stored in the security module of the mobile terminal.

Here, the unique identification information of the mobile terminal may be stored in the vehicle in advance. When the second authentication information is received, the vehicle may determine whether the second authentication information is identical to the previously stored information.

When it is determined that the second authentication information is identical to the previously stored information, the vehicle may transmit a positive signal indicating success in authentication to the mobile terminal. In this case, the mobile terminal may obtain authority to drive the vehicle.

In a case in which the second authentication information is not identical to the previously stored information according to the determination result, the vehicle may transmit a negative signal indicating failure of authentication to the mobile terminal. In this case, the mobile terminal cannot obtain authority to drive the vehicle.

On the basis of the first and second authentication information, when the authentication with respect to the vehicle is successful, the control unit 180 may execute a function related to the vehicle in step S730.

When the positive signal is received from the vehicle, the control unit 180 may determine that authentication with respect to the vehicle has been successful. In this case, the control unit 180 may obtain authority to drive the vehicle, for controlling the vehicle.

In order to control the vehicle, the control unit 180 may execute a function related to the vehicle. The function related to the vehicle may be at least one of a function related to driving of the vehicle and a function that may be executed by interworking with the vehicle.

The function related to driving of the vehicle may include a function of determining a state of the vehicle, a function of controlling driving of the vehicle, an autonomous driving function, a function of opening and closing a door, a function of starting remotely, an emergency siren function, a navigation function, a function of tracking a location of a vehicle, and the like.

The function that may be executed by interworking with the vehicle may include a function that may be executed by using a component (for example, a vehicle speaker or a vehicle display) of the vehicle. For example, the function may include a message function, a mail function, a call function, a music play function, and the like.

For example, as illustrated in FIG. 8A, in order to obtain authority to drive the vehicle, the control unit 180 may perform an authentication procedure with respect to the vehicle.

In detail, the control unit 180 may transmit first authentication information to the vehicle through the vehicle authenticating unit. The first authentication information may be authentication information for performing key authentication of the vehicle.

When it is sensed that the first authentication information has been transmitted, the control unit 180 may transmit second authentication information. The second authentication information may be information for authenticating the mobile terminal with respect to the vehicle.

The control unit 180 may transmit the second authentication information to the vehicle through the short range communication unit. To this end, the control unit 180 may determine whether the short range communication unit is in an activated state, and when the short range communication unit is in a deactivated state, the control unit 180 may switch the short range communication unit to an activated state. Here, the vehicle may be a vehicle including a short range communication unit.

After the second authentication information is transmitted, the control unit 180 may determine whether authentication with respect to the vehicle has been successful on the basis of the first and second authentication information.

Success in the authentication with respect to the vehicle may be a case in which the information previously stored in the vehicle is identical to the first and second authentication information, and failure of the authentication with respect to the vehicle may be a case in which the information previously stored in the vehicle is not identical to at least one of the first and second authentication information.

In a case in which the first and second authentication information is identical to the previously stored information, the vehicle may transmit a positive signal indicating the success in the authentication to the mobile terminal. Meanwhile, when the first and second authentication information is not identical to the previously stored information, the vehicle may transmit a negative signal indicating failure of the authentication to the mobile terminal or may not transmit a positive signal to the mobile terminal.

That is, in the mobile terminal according to an exemplary embodiment of the present disclosure, only when both of the first and second authentication information are identical to the previously stored information, the authentication may be successful. In detail, in an exemplary embodiment of the present disclosure, only when both of key authentication of the vehicle and identification information of the user are identical, authority to drive the vehicle may be obtained. In this manner, in an exemplary embodiment of the present disclosure, security of the vehicle may be strengthened through dual authentication.

When the dual authentication is successful, the control unit 180 may execute a function related to the vehicle. For example, as illustrated in FIG. 8A, the control unit 180 may execute a function related to driving of the vehicle. Here, an execution screen of the function related to driving of the vehicle may be displayed on the display unit 151.

Alternatively, as illustrated in FIG. 8B, the control unit 180 may display icons 830a, 830b, 830c, 830d, 830e, 830f, 830g, and 830h representing functions related to the vehicle on the display unit 151. In this case, the user may select any one of the icons 830a, 830b, 830c, 830d, 830e, 830f, 830g, and 830h associated with functions of the vehicle and execute a function associated with the selected icon.

Meanwhile, when a driving signal of the vehicle is received from the vehicle authenticating unit, the control unit 180 may terminate execution of an application being executed in the mobile terminal. The driving signal of the vehicle may be a signal indicating that the vehicle has started driving. Thus, for safety of driving of the vehicle, the control unit 180 may terminate the execution of the application being currently executed when the vehicle starts driving.

Hereinbefore, the method for controlling a vehicle when the mobile terminal according to an exemplary embodiment of the present disclosure has succeeded in the dual authentication with respect to the vehicle has been described.

Hereinafter, a method for controlling a vehicle when the mobile terminal according to an exemplary embodiment of the present disclosure fails in dual authentication with respect to a vehicle will be described.

FIGS. 9A, 9B, 9C, and 9D are conceptual views illustrating a method for controlling a vehicle when a mobile terminal fails in dual authentication with respect to a vehicle according to an exemplary embodiment of the present disclosure.

In order to obtain authority to drive a vehicle, the control unit 180 may perform an authentication procedure with respect to the vehicle. Here, when authentication on the basis of first authentication information and second authentication information is successful, the control unit 180 may obtain authority to drive the vehicle.

If the dual authentication fails, the control unit 180 may detect authentication-failed information among the first authentication information and the second authentication information.

In a case in which authentication based on the first authentication information has failed, the control unit 180 may determine whether a vehicle authenticating unit has been installed in the mobile terminal. In detail, in a case in which authentication based on the first authentication information has failed and only authentication based on the second authentication information has succeeded, the control unit 180 may check an installation state of the vehicle authenticating unit.

Figure 9A:
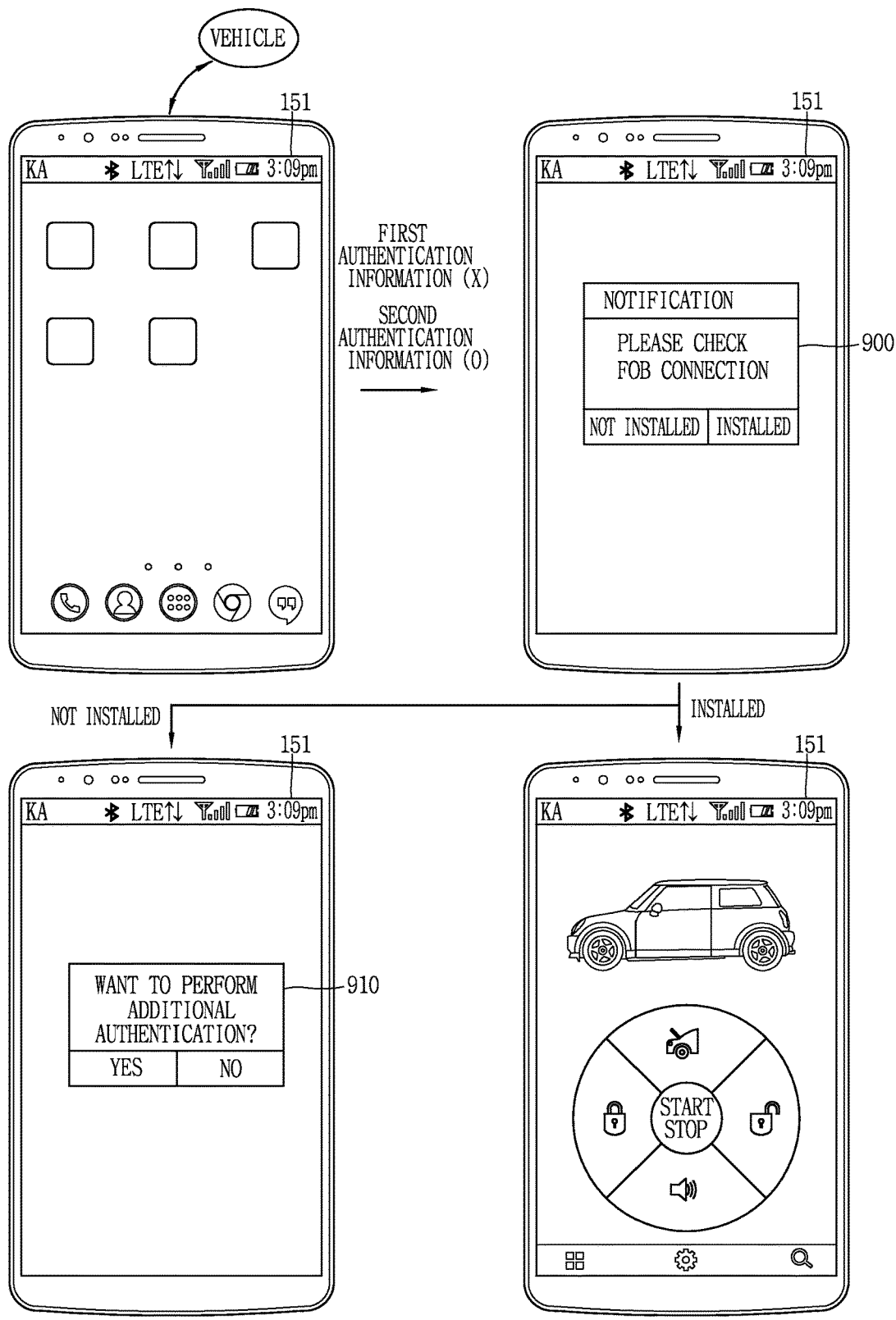
FIGS. 9A, 9B, 9C, and 9D are conceptual views illustrating a method for controlling a vehicle when a mobile terminal fails in dual authentication with respect to a vehicle according to an exemplary embodiment of the present disclosure.
Figure 9B:
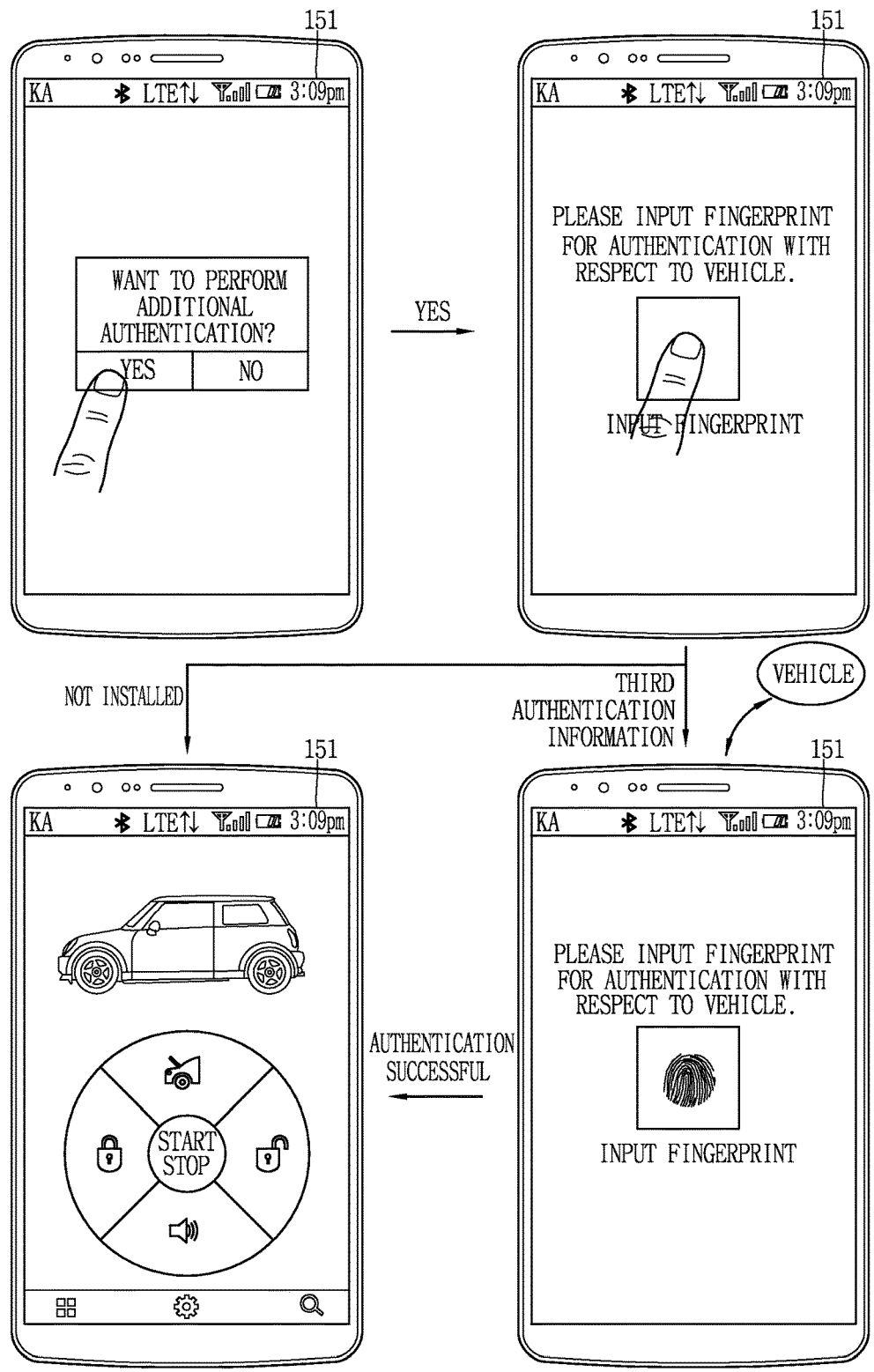

In this case, as illustrated in the first and second drawings of FIG. 9A, the control unit 180 may output notification information 900 on the display unit 151 in order to check whether the vehicle authenticating unit has been installed. That is, when the authentication based on the first authentication information fails, the control unit 180 may first determine whether the vehicle authenticating unit is provided. In this manner, in an exemplary embodiment of the present disclosure, notification information indicating that the vehicle authenticating unit should be installed in the mobile terminal may be provided and information indicating that the vehicle authenticating unit is required may be provided for user recognition.

When user selection indicating that the vehicle authenticating unit has been installed is applied, the control unit 180 may perform the authentication procedure on the basis of the first authentication information. When authentication based on the first authentication information is successful, the control unit 180 may execute a function related to the vehicle. For example, as illustrated in the third drawing of FIG. 9A, when authentication based on the first authentication information is performed, the control unit 180 may output an execution screen of the function related to driving of the vehicle on the display unit 151. Conversely, when authentication based on the first authentication information fails again, the control unit 180 may limit execution of the function related to the vehicle.

Meanwhile, when user selection indicating that the vehicle authenticating unit has not been installed is applied, the control unit 180 may perform an additional authentication procedure. In this case, as illustrated in the fourth drawing of FIG. 9A, the control unit 180 may output notification information 910 for performing an additional authentication procedure on the display unit 151.

That is, in an exemplary embodiment of the present disclosure, when authentication based on the first authentication information fails, an additional authentication procedure for obtaining authority to drive the vehicle may be provided. Thus, even though the vehicle authenticating unit is not installed, the user may obtain authority to drive the vehicle through an additional authentication. Also, since additional authentication is performed, vehicle security may not be marred.

The additional authentication may be authentication of transmitting third authentication information to the vehicle through an NFC communication scheme and receiving a corresponding response signal. The third authentication information may be biometric information of the user, a password, knock code information, or pattern information. The biometric information of the user may include fingerprint information, iris information, face information, heart rate information, or voice information. The knock code information may be pattern information that a tap input applied to the display unit of the mobile terminal forms a pattern. Authentication through the knock code may be authentication through pattern information formed by the tap input.

The NFC communication unit may be formed to perform communication with the vehicle through the NFC communication scheme. The NFC communication is a scheme of transmitting a ciphered signal in conformity with an NFC communication standard at a very short distance. In the case of the NFC communication, a wireless signal may be transmitted and received within 10 centimeters. Thus, the NFC communication has communication distance shorter than Bluetooth communication, and thus, it may have higher security. Based on the characteristics of NFC communication, security may be maintained and the third authentication information may be transmitted to the vehicle.

Whether to perform the additional authentication may be determined by user selection. That is, when a user request for performing additional authentication is received, the control unit 180 may perform additional authentication. For example, as illustrated in the first drawing of FIG. 9B, when a user request for performing additional authentication is received, the control unit 180 may display an execution screen for recognizing fingerprint information of the user on the display unit 151. Here, a fingerprint recognition sensor able to recognize fingerprint information of the user may be disposed in a layered structure on the display unit 151. Thus, the user may input fingerprint information by applying a touch to the display unit 151.

When the additional authentication is performed, the control unit 180 may determine whether the NFC communication unit has been activated. When it is determined that the NFC communication unit is in a deactivated state, the control unit 180 may switch the NFC communication unit to an activated state and transmit third authentication information to the vehicle through the NFC communication unit. In a case in which the NFC communication unit is in an activated according to the determination result, the control unit 180 may transmit the third authentication information to the vehicle.

For example, as illustrated in the second drawing of FIG. 9A, when biometric information of the user is input according to additional authentication, the control unit 180 may transmit the input biometric information of the user to the vehicle through the NFC communication unit in order to obtain authority to drive the vehicle.

The vehicle may receive the third authentication information through the NFC communication unit. Here, the vehicle may determine whether the third authentication information is identical to previously stored information.

When it is determined that the third authentication information is not identical to the previously stored information according to the determination result, the vehicle may not transmit a positive signal indicating that authority to drive the vehicle is obtained to the mobile terminal or transmit a negative signal indicating that authority to drive the vehicle is not obtained to the mobile terminal such that the mobile terminal cannot obtain authority to drive the vehicle.

When it is determined that the third authentication information is identical to the previously stored information, the vehicle may transmit the positive signal to the mobile terminal.

When authentication is successful on the basis of the third authentication information, the control unit 180 may obtain authority to drive the vehicle on the basis of the third authentication information. For example, when authentication is performed on the basis of the third authentication information, the control unit 180 may obtain authority to start the vehicle. Thus, the user may start the vehicle through the mobile terminal, while maintaining security of the vehicle.

If a user request for not performing additional authentication is received from the user, the control unit 180 may obtain authority to drive the vehicle limitedly. That is, in an exemplary embodiment of the present disclosure, in a case in which dual authentication fails and additional authentication is not performed, execution of a function related to security of the vehicle may be limited.

Figure 9C:
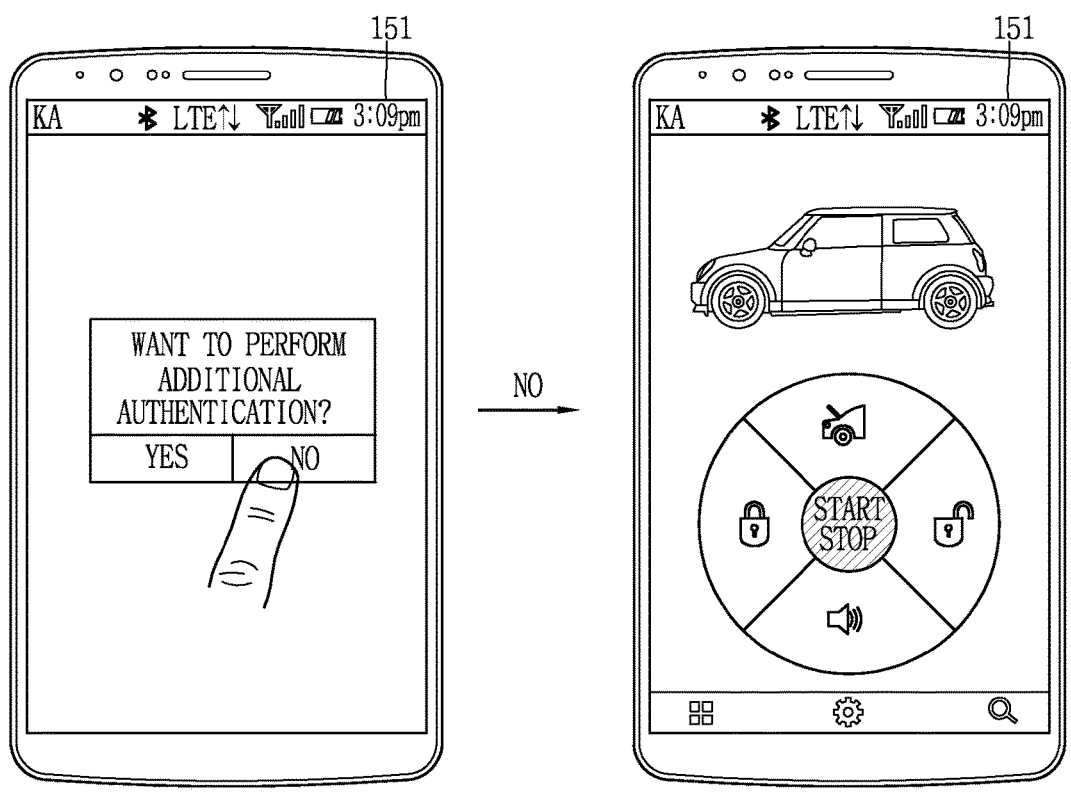

For example, as illustrated in the second drawing of FIG. 9C, when authentication based on the second authentication information is successful, the control unit 180 may obtain authority to drive regarding a door opening and closing function, a trunk opening function, an emergency alarm function, but cannot obtain authority to drive regarding a function of starting the vehicle and a function of checking a state of the vehicle.

Here, the control unit 180 may visually display a graphic object representing a function of the authority to drive the vehicle and a graphic object representing a function without authority to drive the vehicle on the display unit 151 such that the both graphic objects are distinguished. For example, as illustrated in the second drawing of FIG. 9C, the control unit 180 may change a shade (or darkness) of the graphic object representing the function of not obtaining authority to drive the vehicle to display the same on the display unit 151. That is, in an exemplary embodiment of the present disclosure, when authority to drive the vehicle is low, only authority to drive regarding functions having low relevance to security of the vehicle.

In a state in which authority to drive is limited, the control unit 180 may receive a request for executing a function limited in authority to drive from the user. For example, as illustrated in the first drawing of FIG. 9D, in a state in which a vehicle start function is limited, the control unit 180 may request the vehicle start function.

When the request for executing the function limited in authority to drive is received, the control unit 180 may output notification information for determining whether to perform additional authentication. For example, as illustrated in the first and second drawings of FIG. 9D, when a request for executing a function limited in authority to drive is received, the control unit 180 may display notification information for determining whether to perform additional authentication on the display unit 151.

When a user request for executing the additional authentication is received, the control unit 180 may perform the additional authentication procedure as described above. Here, the control unit 180 may display screen information indicating the additional procedure on the display unit 151. For example, as illustrated in the third drawing of FIG. 9D, the control unit 180 may display screen information for inputting fingerprint information of the user on the display unit 151.

Figure 9D:
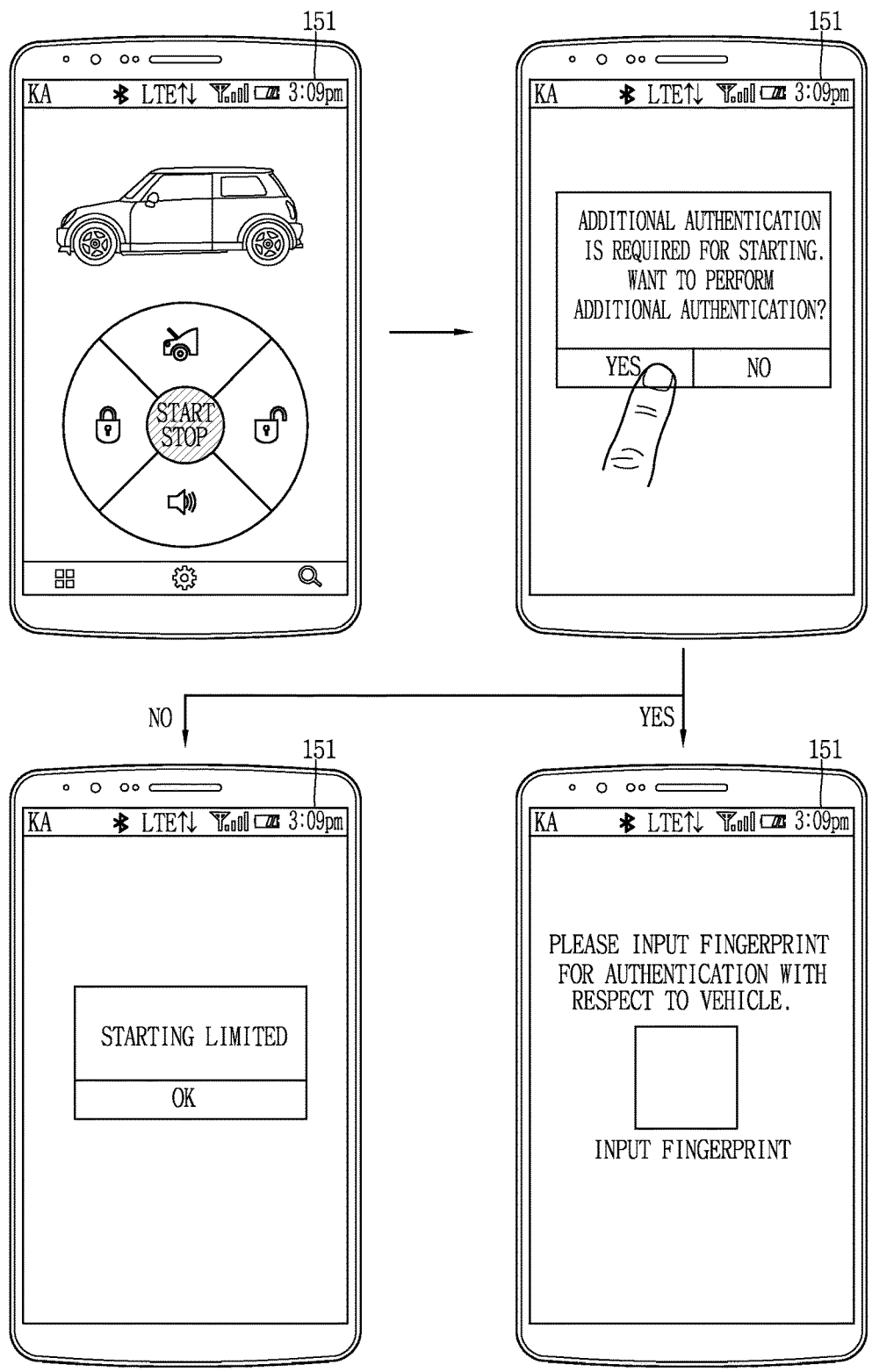

Conversely, as illustrated in the fourth drawing of FIG. 9D, when a user request for not executing the additional authentication is received, the control unit 180 may display notification information indicating that the vehicle start function is limited, on the display unit 151. In this case, the user cannot start the vehicle through the mobile terminal.

In the above, the case in which authentication based no the first authentication information fails and authentication based on the second authentication information is successful has been described, but addition authentication may be applied in the similar manner even to a case in which authentication based on the first authentication information is successful and authentication based on the second authentication information fails, or a case in which authentication based on the first and second authentication information fails.

Hereinbefore, the method for obtaining authority to drive the vehicle through additional authentication when dual authentication fails between the mobile terminal and the vehicle has been described. In this manner, the present disclosure provides the method for controlling the vehicle through additional authentication to the user who has failed in the dual authentication.

Hereinafter, a method for providing authority to drive different vehicles according to a preset condition when dual authentication is successful will be described.

Figure 10A:
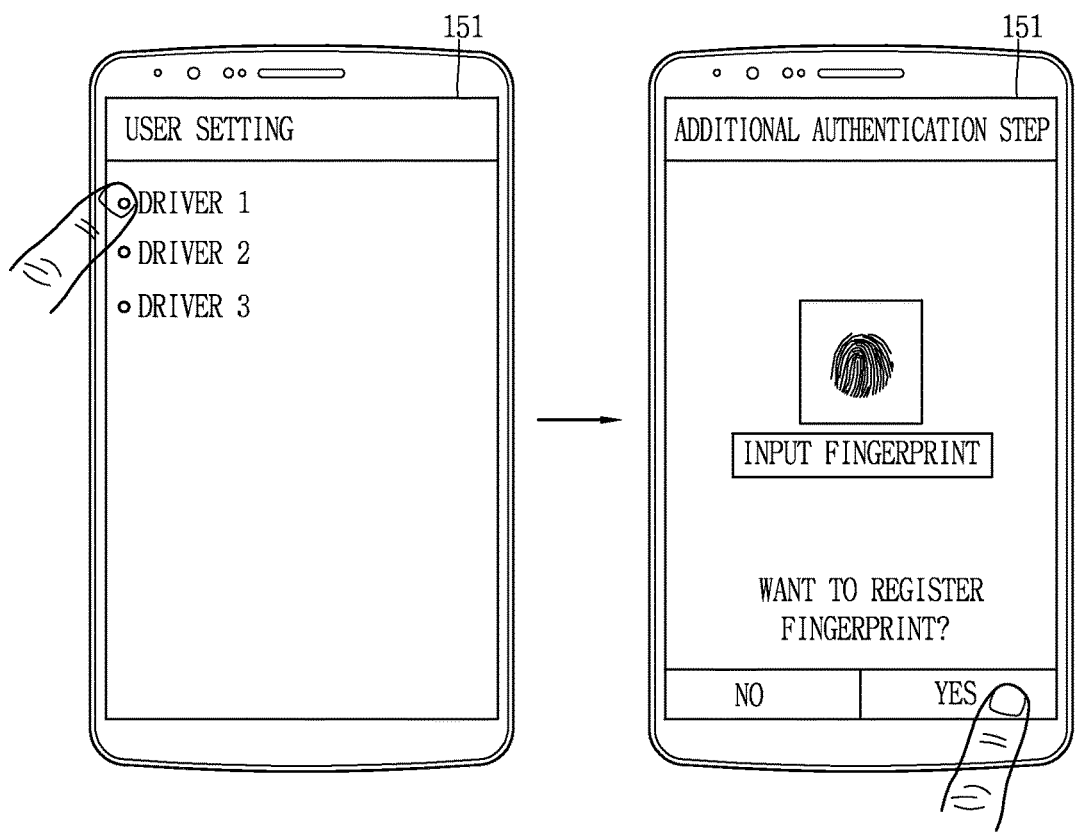
FIGS. 10A and 10B are conceptual views illustrating a method for providing authority to drive different vehicles to users.
Figure 10B:
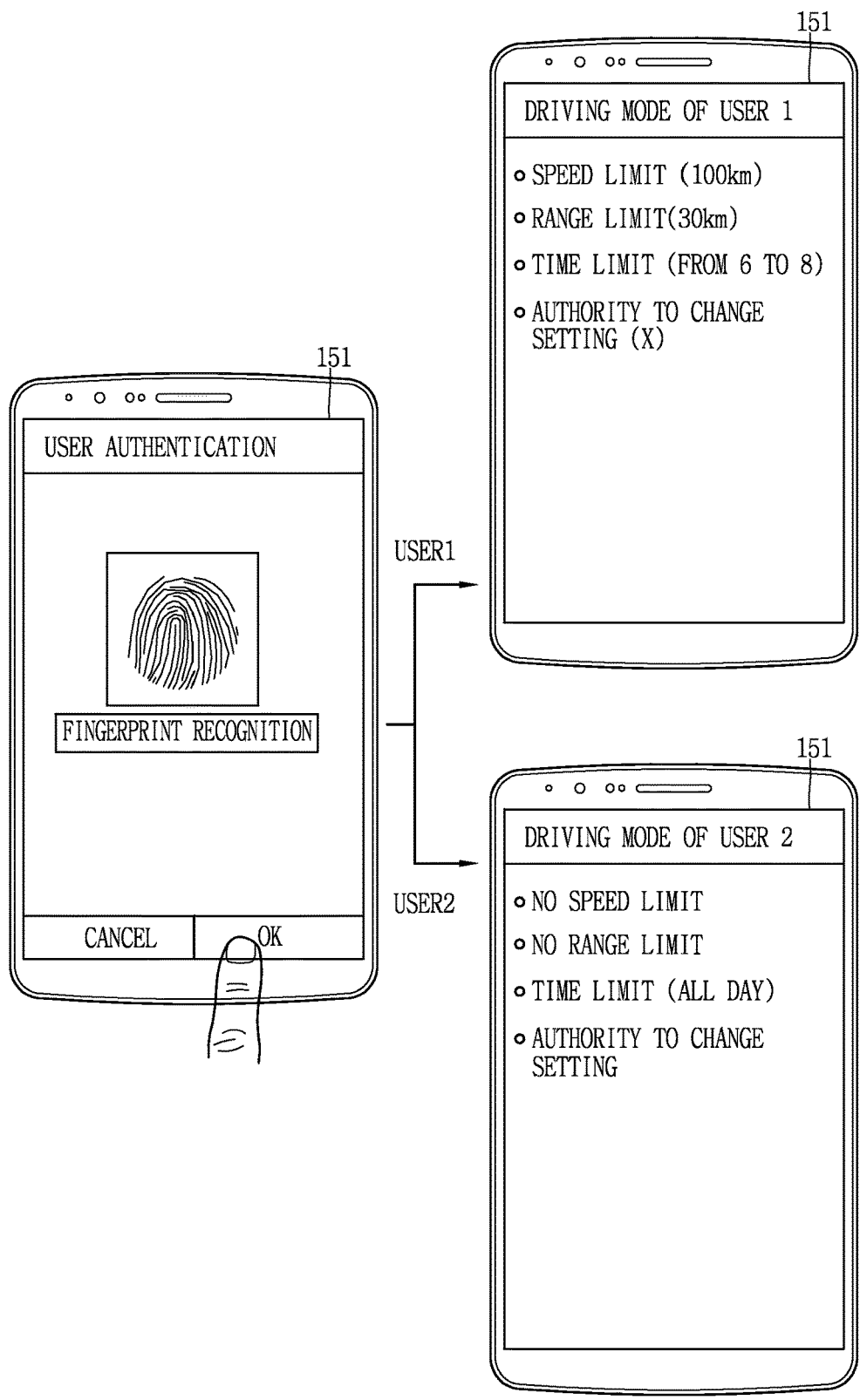
Figure 11:
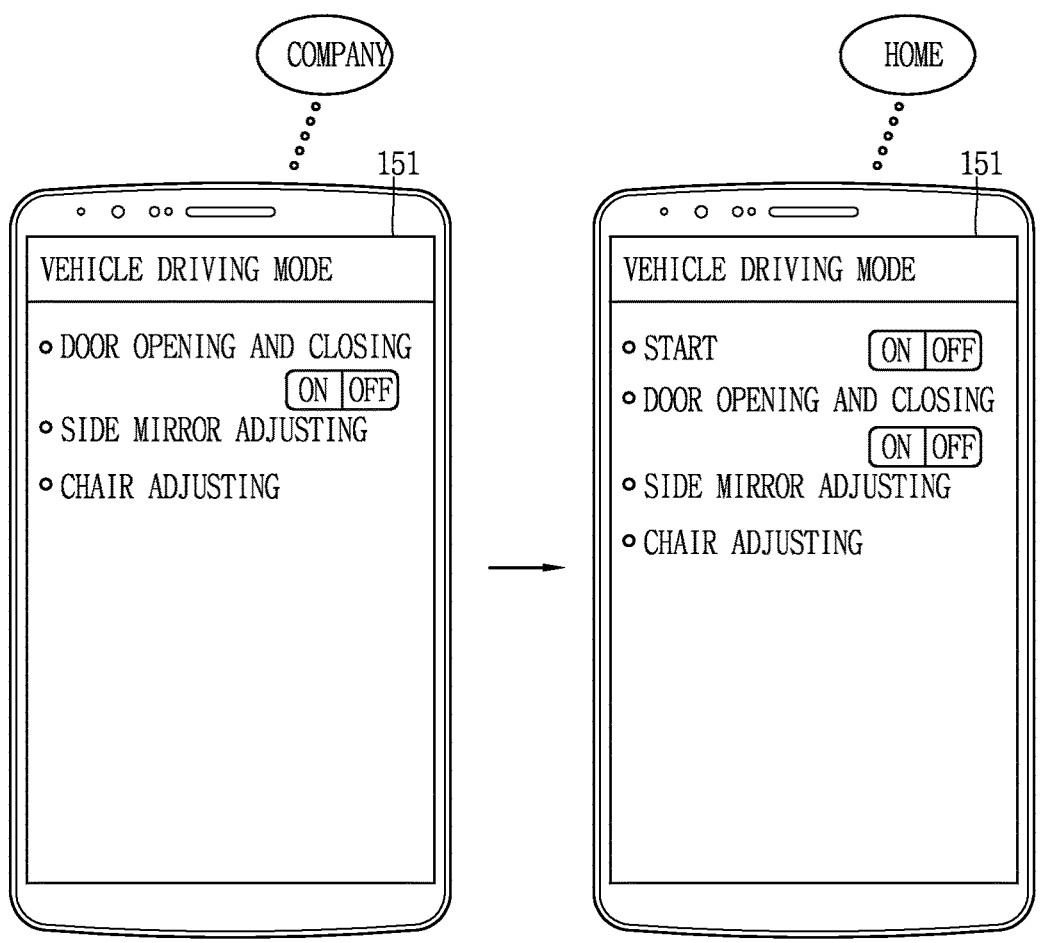
FIG. 11 includes conceptual views illustrating a method for providing authority to drive to different vehicles according to locations.

FIGS. 10A and 10B are conceptual views illustrating a method for providing authority to drive different vehicles to users, and FIG. 11 includes conceptual views illustrating a method for providing authority to drive to different vehicles according to locations.

The control unit 180 of the mobile terminal according to an exemplary embedment performs key authentication of a vehicle, and when the key authentication is successfully performed, the control unit 180 may perform dual authentication through the short range communication unit with respect to the vehicle, thereby obtaining authority to drive the vehicle.

Also, the control unit 180 may obtain authority to drive different vehicles according to a preset condition. The preset condition may be at least one of a condition related to identification information of the mobile terminal, a condition related to a location of the mobile terminal, and a condition regarding whether an additional terminal is present. The identification information of the mobile terminal may include biometric information of the user of the mobile terminal, a unique number of the mobile terminal, or phone number information of the mobile terminal.

The additional terminal may be a terminal able to communicate with a vehicle, addition to the mobile terminal. For example, the additional terminal may be a wearable terminal such as a watch type terminal, or the like. For example, in an exemplary embodiment of the present disclosure, when the vehicle recognizes the additional terminal, the vehicle may provide a higher level of authority to drive to the mobile terminal.

The preset condition may be set when the mobile terminal is released from the factory or may be set by the user. For example, as illustrated in FIG. 10A, the user may input his or her fingerprint information to the mobile terminal and store the same as drive information in the memory unit 170. Here, in the memory, the stored driver information may be associated with a security level and stored. For example, a first user may be associated with a third security level and stored, and a second user may be associated with a first security level and stored.

The authority to drive the vehicle may include a plurality of different security levels able to control the vehicle by the mobile terminal. For example, the authority to drive the vehicle may include a first security level allowing for controlling a function related to the vehicle, a second security level allowing for controlling a function of driving and payment of the vehicle, a third security level allowing for controlling only a function related to driving of the vehicle, and a fourth security level allowing for execution of only a function not related to security of the vehicle such as door opening and closing or air-conditioner.

When any one of the plurality of security levels is determined on the basis of a preset condition, the control unit 180 may provide a function related to the vehicle that may be executed in the determined security level.

For example, as illustrated in FIG. 10B, when fingerprint information of the first user is received, the control unit 180 may provide a function related to the vehicle that can be executed in the third security level. For example, in the third security level, a speed of a vehicle may be limited to 100 kilometers or lower, a driving available range of the vehicle is within 30 kilometers, and a driving available time of the vehicle may be limited to range from 6:00 to 8:00

Meanwhile, as illustrated in FIG. 10B, when fingerprint information of the second user is received, the control unit 180 may provide a function related to a vehicle that can be executed in the first security level. For example, in the first security level, there is no limitations in the speed of the vehicle, the driving available range of the vehicle, and the driving available time of the vehicle, and a function for changing a set security level may be provided. Thus, the second user may change security levels of other people set as drivers, as well as a security level of his or her own.

Also, although not shown, the control unit 180 may provide a function of indicating a position of a chair, a position of a side mirror, a driving style, and a frequently visited destination for different users. For example, when the first fingerprint of the first user is sensed, the control unit 180 may detect a position of a side mirror associated with the first finger, and may transmit information related to the position of the side mirror to the vehicle. Also, the control unit 180 may detect the position of the side mirror associated with the first fingerprint and directly transmit a control command for adjusting the position of the side mirror installed in the vehicle to the vehicle.

In another example, the control unit 180 may set a security level of the vehicle on the basis of location information of the mobile terminal. In detail, the control unit 180 may set different security levels according to location information. Alternatively, in a case in which the current location of the mobile terminal is previously stored location information, the control unit 180 may set the mobile terminal to have a first security level, and when the current location of the mobile terminal is not previously stored location information, the control unit 180 may set the mobile terminal to have any one of second, third, and fourth levels limited in authority to drive, compared with the first security level.

For example, in a case in which the current location of the mobile terminal is a location set as "home", the control unit 180 may set a security level thereof to the first security level, and in a case in which the current location of the mobile terminal is a location set as "company", the control unit 180 may set a security level thereof to the third security level.

Meanwhile, after security levels are set according to preset conditions, the control unit 180 may sense that a request for a function beyond the authority of security level set by the user is received. For example, in a state in which the third security level limiting a driving available time is set, the control unit 180 may receive a request for executing a function related to driving of the vehicle at a time outside of the driving available time from the user.

In this case, the control unit 180 may transmit notification information indicating that the request has made to a preset external terminal. Thus, in an exemplary embodiment of the present disclosure, by notifying other user about the request beyond the authority to drive set with the security level, security of the vehicle may be strengthened.

Meanwhile, in a case in which a location of the mobile terminal is a preset location, the control unit 180 may set the first security level without having to perform an authentication procedure. For example, in a case in which the mobile terminal is currently located at "home", the control unit 180 may obtain the first security level without authentication through the NFC communication unit or the short-range communication unit. Thus, according to an exemplary embodiment of the present disclosure, the user may control the vehicle without having to perform an authentication procedure at a location where security of the vehicle is not required to be strengthened, for the user convenience.

Hereinafter, a method for controlling a vehicle using a rear side key will be described.

Figure 12A:
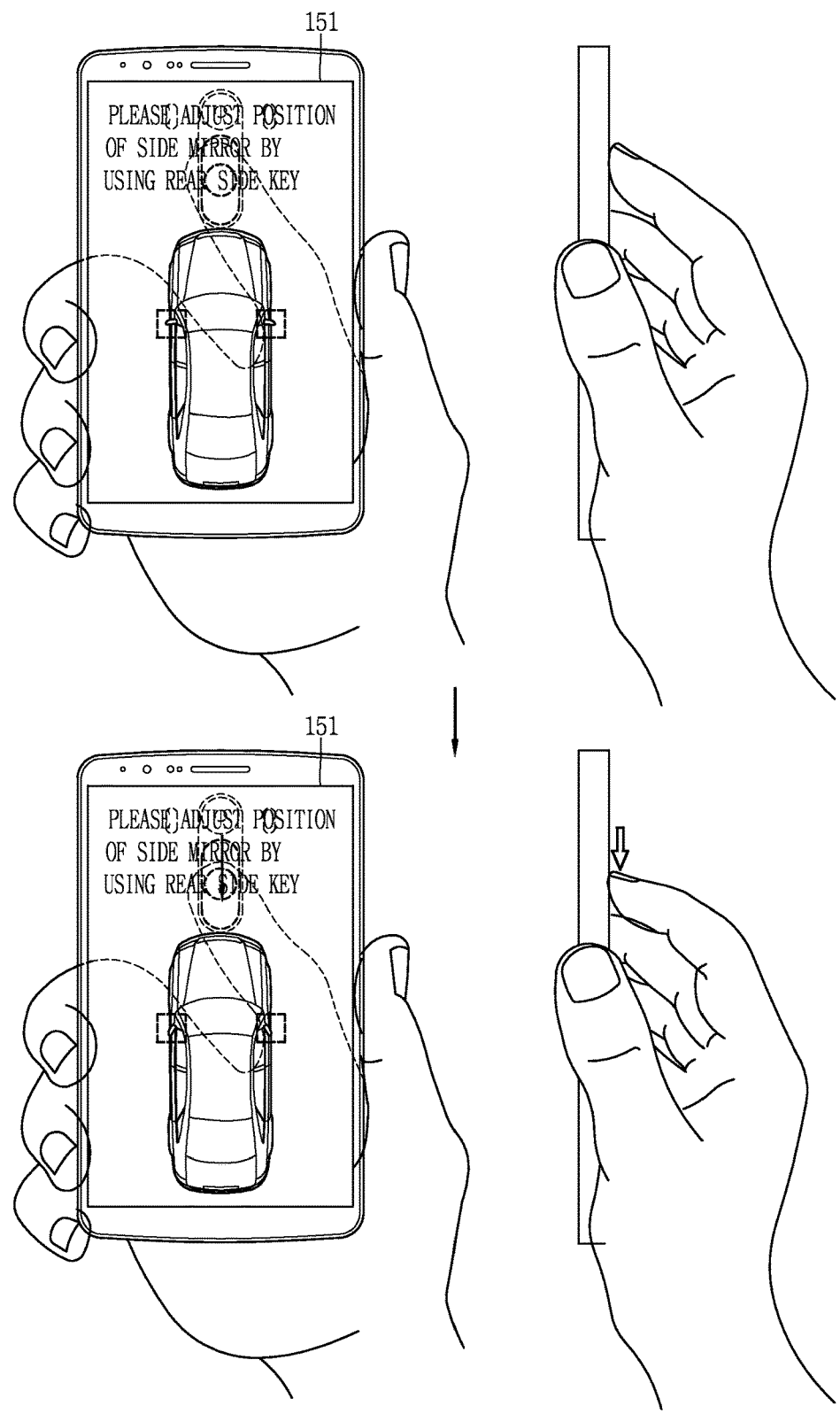
FIGS. 12A and 12B are conceptual views illustrating a method for controlling a vehicle using a rear side key provided in a mobile terminal.
Figure 12B:
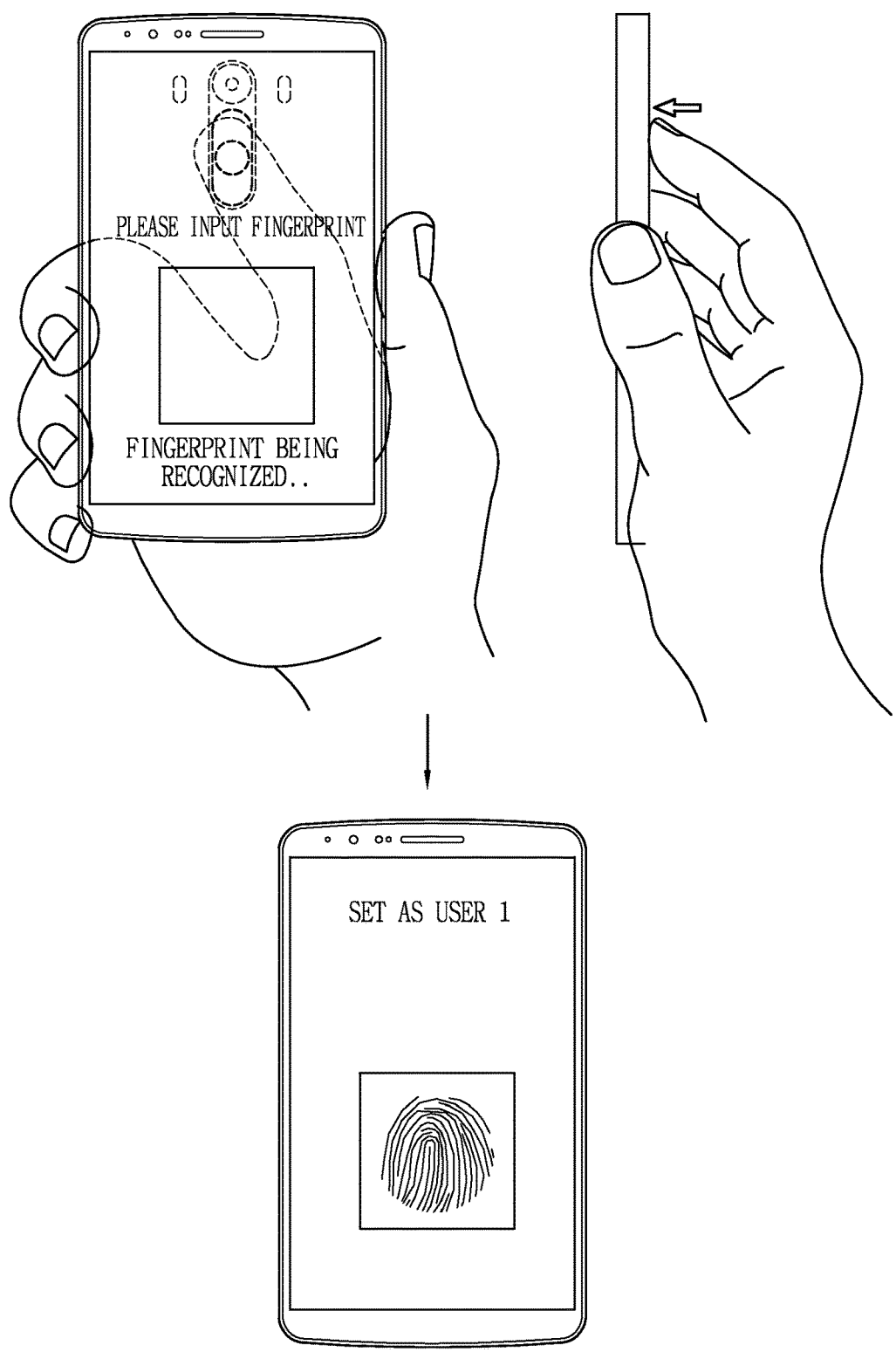

FIGS. 12A and 12B are conceptual views illustrating a method for controlling a vehicle using a rear side key provided in a mobile terminal.

The mobile terminal according to an exemplary embodiment of the present disclosure may have a main body having a front surface, a side surface, and a rear surface. A display unit 151 (or a touch screen) displaying visual information may be disposed in at least a region of the front surface and the side surface of the main body of the mobile terminal in order to sense a touch applied thereto. Also, a user input unit formed to sense a touch may be further provided on the rear surface of the main body of the mobile terminal. The user input unit disposed on the rear surface of the main body of the mobile terminal may be referred to as a "rear side key". Here, the "rear side key" may also be referred to various other names such as a "rear side input unit" or a "rear button unit".

The rear side key may sense a user's fingerprint, as well as a touch. Here, the control unit 180 may determine an input applied with pressure equal to or lower than a preset pressure level, as a touch input, and determine an input applied with pressure higher than the preset pressure level as an input for fingerprint recognition.

After authentication with respect to a vehicle is completed through the vehicle authenticating unit and the short range communication unit, when a function related to the vehicle is executed, the control unit 180 may perform control related to the vehicle by using the rear side key.

For example, as illustrated in the upper drawing of FIG. 12A, the control unit 180 may control a position of the side mirror of the vehicle through a touch applied to the rear side key.

That is, on the basis of a drag input applied downwardly with respect to the front surface of the main body of the mobile terminal, the control unit 180 may move the side mirror toward a door of the vehicle. Also, the control unit 180 may move the side mirror by a movement length corresponding to the length by which the drag input has been sensed. For example, when a first length is sensed as a length of the drag input, the control unit 180 may move the side mirror by the length corresponding to the first length.

Here, referring to the drawings of FIG. 12A, an execution screen in which a position of the side mirror has been changed may be displayed on the display unit 151. That is, since the user applies a touch to the display unit 151 through a touch input unit such as a user's finger or a stylus pen, or the like, by using the rear side key, a problem in which a region of the display unit 151 is covered may be solved. Also, a user's visual field may be secured and a configuration in which an external device is controlled according to a user input may be checked in real time.

In another example, as illustrated in the upper drawing of FIG. 12B, the user may input fingerprint information through the rear side key. That is, the control unit 180 may receive fingerprint information of the user's finger through the rear side key.

In this case, on the basis of the fingerprint information of the user's finger, the control unit 180 may set a security level. For example, in a case in which the fingerprint information of the user's finger corresponds to a user 1, the control unit 180 may set a security level corresponding to the user 1.

Also, although not shown, on the basis of a touch applied to the rear side key, the control unit 180 may execute a function of turning on or off the start of the vehicle. For example, in response to a touch applied to the rear side key, the control unit 180 may transmit a start signal to the vehicle.

Meanwhile, the method for executing a function related to the vehicle using the rear side key described above may also be performed in the same manner through a user input unit provided on the front surface or the side surface of the main body of the mobile terminal.

Hereinbefore, the method for controlling a vehicle by utilizing the rear side key of the mobile terminal has been described.

Hereinafter, a method for controlling a vehicle through a watch type terminal will be described.

Figure 14:
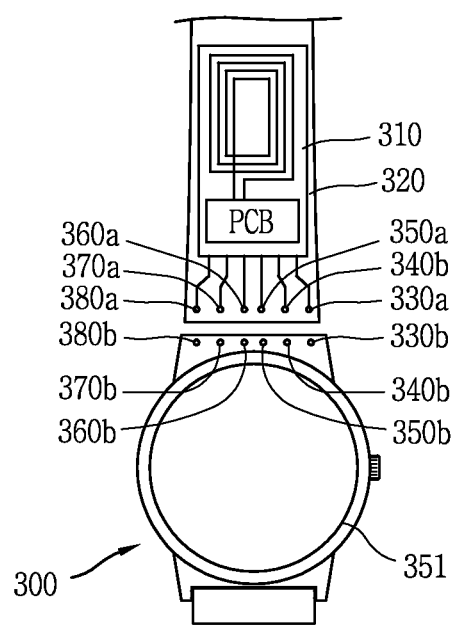
FIG. 14 is a conceptual view illustrating an embodiment of a watch type terminal according to the present disclosure.
Figure 15A:
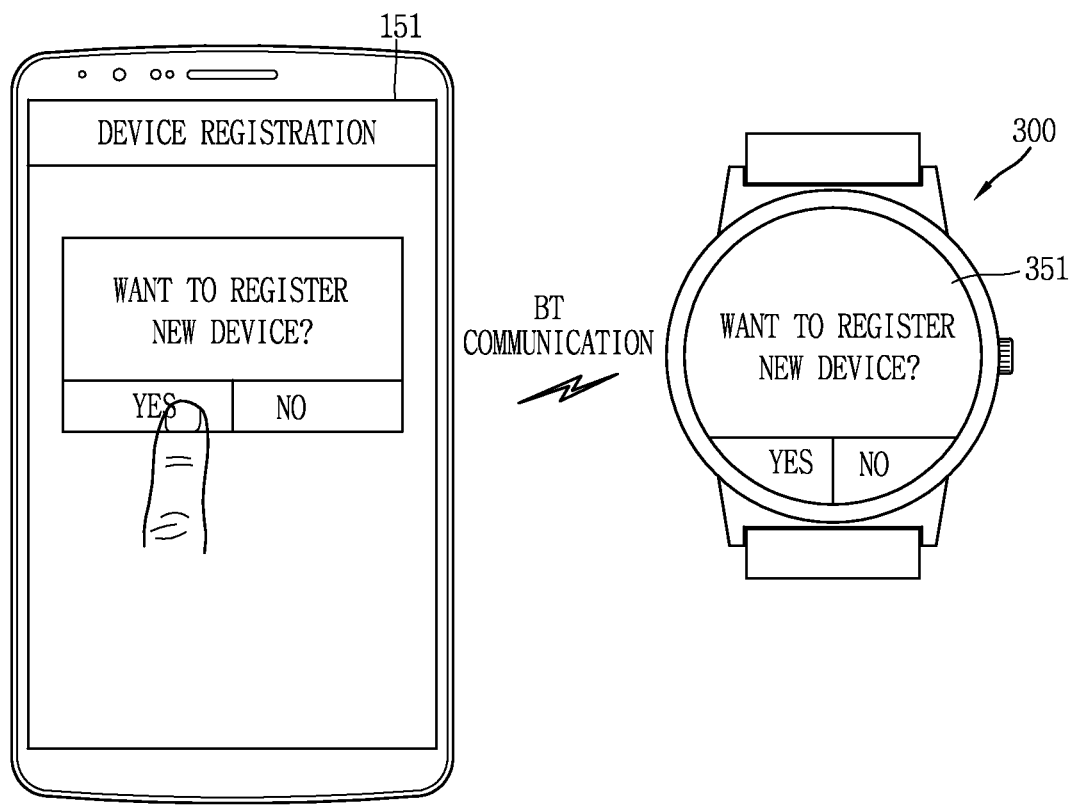
FIGS. 15A, 15B, and 15C are conceptual views illustrating a method for authenticating a watch type terminal such that the watch type terminal may control a vehicle through the mobile terminal.
Figure 15B:
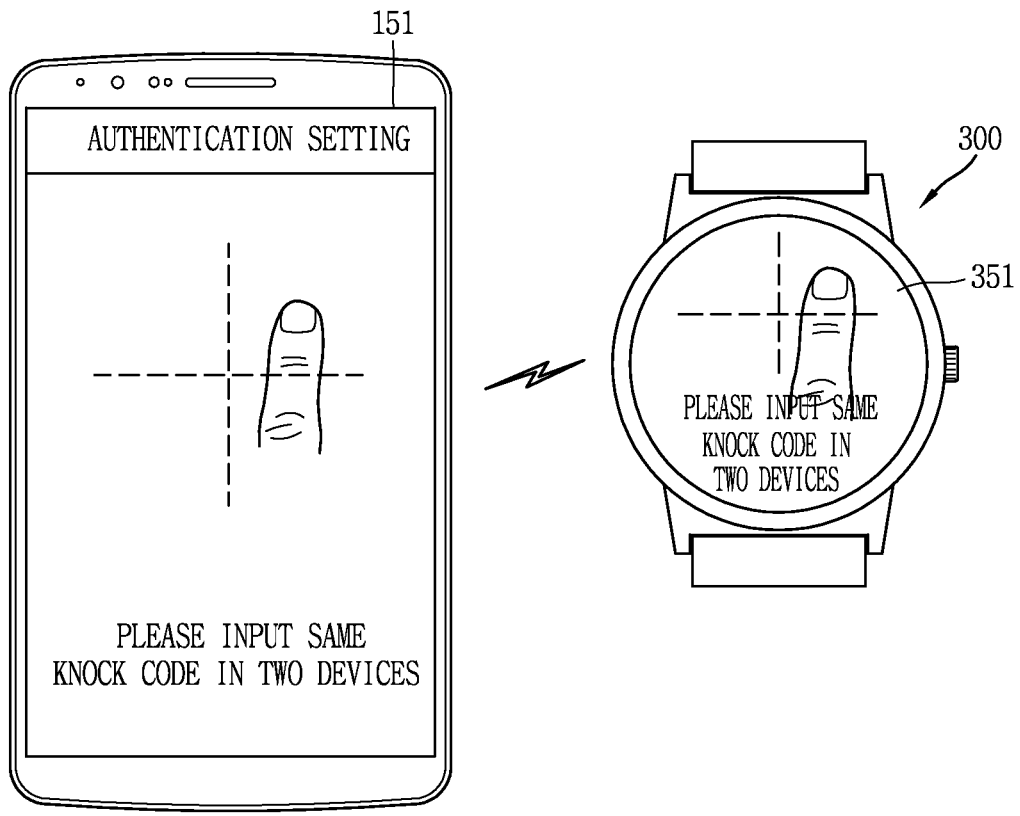
Figure 15C:
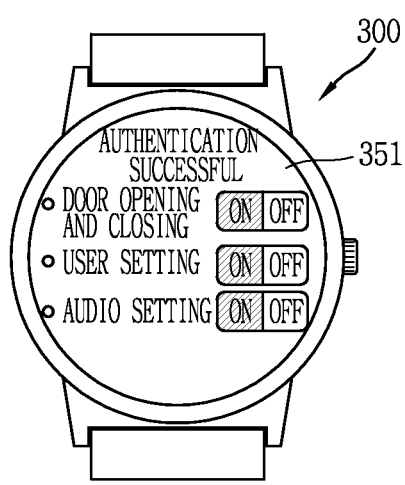
Figure 16A:
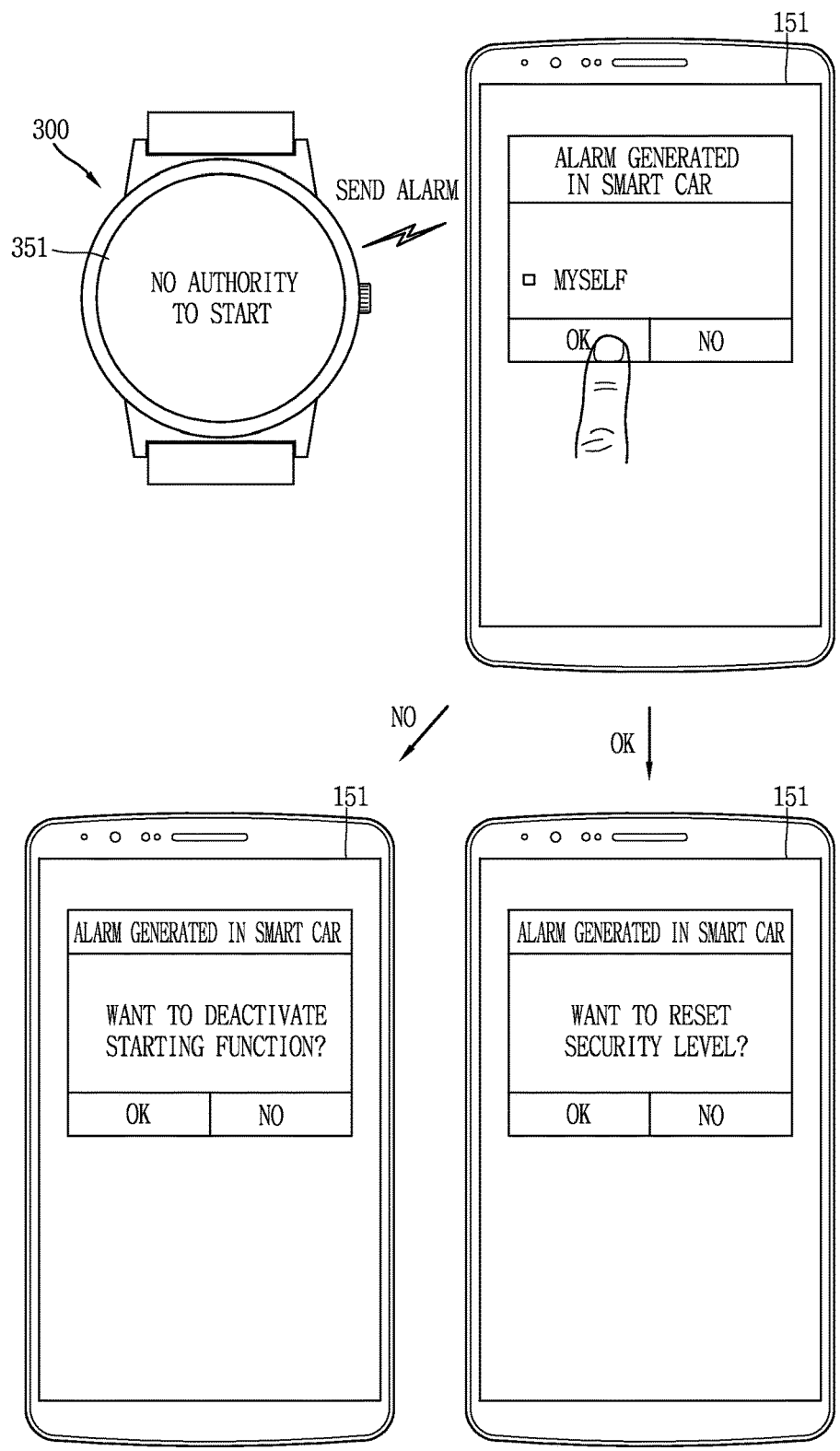

FIG. 13 is a flow chart illustrating a method for performing control related to a vehicle by using a watch type terminal. FIG. 14 is a conceptual view illustrating an embodiment of a watch type terminal according to the present disclosure. FIGS. 15A, 15B, and 15C are conceptual views illustrating a method for authenticating a watch type terminal such that the watch type terminal may control a vehicle through the mobile terminal. FIGS. 16A and 16B are conceptual views illustrating a vehicle through an authentication-completed watch type terminal.

The authentication-completed mobile terminal for controlling a vehicle according to an exemplary embodiment of the present disclosure may register a watch type terminal in order to execute a function related to a vehicle by using the watch type terminal in step S1310.

When the mobile terminal according to an exemplary embodiment of the present disclosure is completely authenticated, the mobile terminal may obtain authority to drive from the vehicle and execute a function related to the vehicle. The method for obtaining authority to drive the vehicle has been described above.

Here, in an exemplary embodiment of the present disclosure, the authority to drive the vehicle may be provided to the watch type terminal which has not obtained authority to drive from the vehicle. That is, as the mobile terminal provides the authority to drive the vehicle to the watch type terminal, the user may limitedly control the vehicle even through the watch type terminal which does not have a vehicle authenticating unit.

Meanwhile, the watch type terminal may have a vehicle authenticating unit. That is, the watch type terminal may have a vehicle authenticating unit and control a vehicle through key authentication of the vehicle.

For example, as illustrated in FIG. 14, the watch type terminal according to an exemplary embodiment of the present disclosure may have a vehicle authenticating unit installed in a band unit 320 worn on a wrist. In detail, as illustrated in FIG. 14, the band unit 320 may be formed to be detachable with respect to a display unit 351.

Here, the display unit 351 and the band unit 320 may include coupling portions by which they may be coupled. The coupling portions may include first coupling portions 330a, 340a, 350a, 360a, and 370a installed on the main body and second coupling portions 330b, 340b, 350b, 360b, and 370b installed on the band unit 320.

The coupling portions may be formed to supply power to the control unit or the vehicle authenticating unit provided in the main body or perform data communication between the control unit and the vehicle authenticating unit.

In a case in which the vehicle authenticating unit is provided in the watch type terminal, the control methods applied to the mobile terminal may be applied. For example, the watch type terminal may supply power to the vehicle authenticating unit from the power supply unit of the main body through the coupling portions and subsequently transmit authentication information to the vehicle through the vehicle authenticating unit in order to obtain authority to drive the vehicle.

Meanwhile, in an exemplary embodiment of the present disclosure, both the watch type terminal having the vehicle authenticating unit and the watch type terminal without the vehicle authenticating unit may obtain authority to drive the vehicle from the mobile terminal and control the vehicle.

The control unit 180 may perform authentication to obtain authority to drive the vehicle through the short range communication unit. For example, as illustrated in FIG. 15A, the control unit 180 may perform Bluetooth communication with the watch type terminal.

Authentication for obtaining authority to drive the vehicle may refer to obtaining, by the watch type terminal, authority to execute a function related to the vehicle, although the vehicle and the watch type terminal do not directly communicate with each other.

To this end, the control unit 180 may perform data communication to transmit and receive security information to and from the watch type terminal. For example, as illustrated in FIG. 15B, the control unit 180 may control the display unit 151 to output screen information for generating security information. Also, the watch type terminal 300 may output screen information for generating security information on the display unit 351 thereof.

The security information may be at least one of password information, pattern information, and biometric information. For example, as illustrated in FIG. 15B, the user may input pattern information formed by a tap input applied to the display unit 151 of the mobile terminal, as security information. Also, the user may input pattern information formed by a tap input applied to the display unit 351 of the watch type terminal, as security information.

The control unit 180 may receive security information from the user and from the watch type terminal 300.

Here, the control unit 180 may determine whether the security information received from the watch type terminal 300 is identical to the security information received from the user. When it is determined that the security information received from the watch type terminal 300 is identical to the security information received from the user, the control unit 180 may provide authority to drive the vehicle to the watch type terminal 300. That is, the control unit 180 may transmit information related to authority to drive the vehicle to the watch type terminal 300. In this case, the watch type terminal 300 may control the vehicle through information related to the authority to drive the vehicle.

The information related to the authority to drive the vehicle may be information indicating that the mobile terminal has provided the authority to drive the vehicle to the watch type terminal 300. Thus, the watch type terminal 300 may control the vehicle on the basis of the information related to the authority to drive the vehicle, even without a separate authentication procedure with respect to the vehicle.

Also, after providing the authority to drive the vehicle to the watch type terminal 300, the control unit 180 may store identification information of the watch type terminal 300 in the memory 170. Storing of the identification information of the watch type terminal 300 such that the watch type terminal 300 may control the vehicle may be understood as "authenticating the watch type terminal 300 with respect to the vehicle" or "registering the watch type terminal 300 in the vehicle".

When it is determined that the security information received from the watch type terminal 300 is not identical to the security information received from the user, the control unit 180 may not provide the authority to drive the vehicle to the watch type terminal 300.

When the watch type terminal 300 is registered, the mobile terminal according to an exemplary embodiment of the present disclosure may set a security level related to driving of the vehicle in the registered watch type terminal 300 in step S1320.

When the watch type terminal 300 is registered, the control unit 180 may set a security level related to driving of the vehicle. The security level may refer to authority to drive the vehicle, as described above.

The watch type terminal 300 may be set to have any one of a plurality of security levels. Here, the security level of the watch type terminal 300 may be determined according to a preset condition or by a user selection.

Also, the security level of the watch type terminal 300 may be determined on the basis of a security of the mobile terminal. For example, when the security level of the mobile terminal is the second security level, the security level of the watch type terminal 300 may be set to the second security level or the third security level having authority to drive lower than that of the second security level. That is, the security level of the watch type terminal 300 cannot have a level higher than the security level of the mobile terminal that performs an authentication procedure with the watch type terminal 300. That is, since the watch type terminal 300 is not a device performing authentication through direct communication with the vehicle, authority to drive thereof may be set to be low in order to maintain security of the vehicle.

For example, referring to FIG. 15C, the control unit 180 may set only authority to drive regarding a function of opening and closing a door of the vehicle, a function of tracking a location of the vehicle, a function of sensing a state of the vehicle, and a function of setting audio of the vehicle, for the watch type terminal 300.

When the security level for driving the vehicle is set, in an exemplary embodiment of the present disclosure, the vehicle is controlled by the watch type terminal 300 in step S1330.

After the watch type terminal 300 obtains authority to drive the vehicle, the watch type terminal 300 may control the vehicle on the basis of the security level. For example, the watch type terminal 300 may control the vehicle such that a door of the vehicle is opened on the basis of a user request.

Meanwhile, the watch type terminal 300 (or a control unit of the watch type terminal 300) which has obtained authority to drive the vehicle through the mobile terminal may receive a user request regarding a function that is not allowed to be executed in the watch type terminal 300.

In this case, since the watch type terminal 300 does not have authority to drive for starting the vehicle, execution of the function of starting the vehicle may be limited. Also, the watch type terminal 300 may output notification information indicating that the watch type terminal 300 does not have authority to start the vehicle on the display unit 351. The notification information may be output in at least one of a visual manner, audible manner, and tactile manner.

Also, when a user request for the function of starting the vehicle that the watch type terminal 300 does not have authority to drive by a preset number of times, the watch type terminal 300 may transmit notification information indicating that the user request has been received, to the preset mobile terminal. For example, referring to FIG. 16A, the watch type terminal 300 may transmit notification information indicating that the user request for a function of starting the vehicle that the watch type terminal 300 does not have the authority to drive, to the preset mobile terminal. Accordingly, the user of the mobile terminal may currently recognize that there have been attempts to start the vehicle through the watch type terminal 300 without authority to drive.

Upon receiving the notification information, the control unit 180 of the mobile terminal may display the notification information on the display unit 151. This is to check whether the user who currently uses the watch type terminal 300 is the identical person.

In a state in which the notification information is output, the control unit 180 may perform different controlling on the basis of a user selection.

In detail, when it is sensed that the user of the watch type terminal 300 is not the identical person, the control unit 180 may control the watch type terminal 300 to deactivate information related to driving of the vehicle provided thereto. That is, the control unit 180 may delete authority to drive provided to the watch type terminal 300 such that the watch type terminal 300 cannot control the vehicle.

That is, when it is determined that the request for executing the function of starting the vehicle has been attempted by someone else, the control unit 180 may interrupt all the functions of controlling the vehicle, determines that there is a problem with security of the vehicle, and informs the user accordingly.

Meanwhile, a user selection indicating that the user of the watch type terminal 300 is the identical person, the control unit 180 may perform the step of determining whether to reset a security level to obtain authority to drive regarding starting of the vehicle in the watch type terminal 300. For example, as illustrated in FIG. 16A, the control unit 180 may output a pop-up window inquiring as to whether to reset a security level of the watch type terminal 300, on the display unit 151. Here, the user may reset the security level or may control the watch type terminal 300 to maintain the security level as is.

When a user request for resetting the security level is received, the control unit 180 may execute the function of setting a security level in the mobile terminal and the watch type terminal 300. Here, as illustrated in FIG. 16B, the control unit 180 may display screen information for inputting the same security information as the security information for registering the watch type terminal 300 on the display unit 151 and the display unit 351 of the watch type terminal 300.

Thereafter, when security information received from the user and security information received from the watch type terminal 300 are identical, the control unit 180 may set the watch type terminal 300 to have a security level having authority to drive higher than that of the previously set security level. In this case, the user may be provided with the function of starting the vehicle through the watch type terminal 300.

Meanwhile, although not shown, in an exemplary embodiment of the present disclosure, when the watch type terminal 300 is registered, the watch type terminal 300 may be used as an authentication unit. In detail, in a state in which authentication is performed between the vehicle and the mobile terminal, when the watch type terminal 300 and the vehicle are authenticated, higher authority to drive the vehicle may be obtained. That is, in an exemplary embodiment of the present disclosure, since a plurality of devices are authenticated with respect to the vehicle, it can be reliably known that the holders of the plurality of devices is a driver of the vehicle, and thus, security of the vehicle may be strengthened and the authenticated user may conveniently perform controlling.

Hereinbefore the method for obtaining, by the watch type terminal 300, authority to drive the vehicle through the authenticated mobile terminal from the vehicle, without directly communicating with the vehicle, has been described. In this manner, in an exemplary embodiment of the present disclosure, the vehicle may be controlled using the watch type terminal 300 which does not have a vehicle authenticating unit.

Hereinafter, a method for performing payment related to a vehicle in the mobile terminal which has obtained authority to drive the vehicle will be described.

Figure 17A:
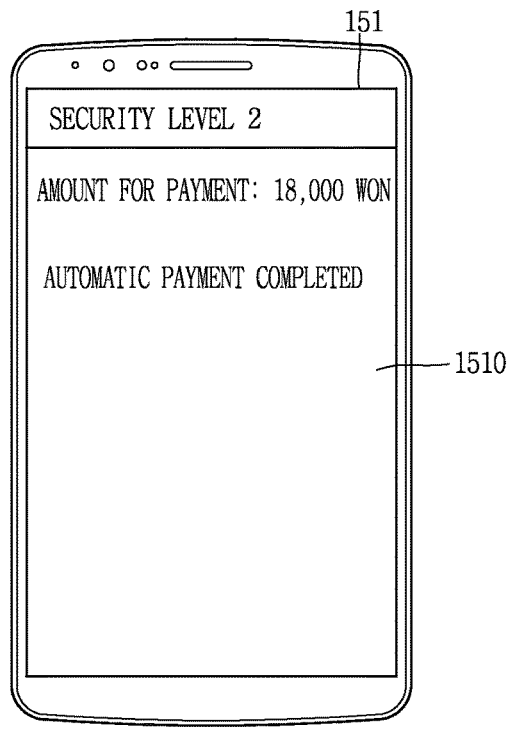
FIGS. 17A, 17B, and 17C are conceptual views illustrating a method for making payment related to a vehicle by a mobile terminal which has acquired authority to drive a vehicle.
Figure 17B:
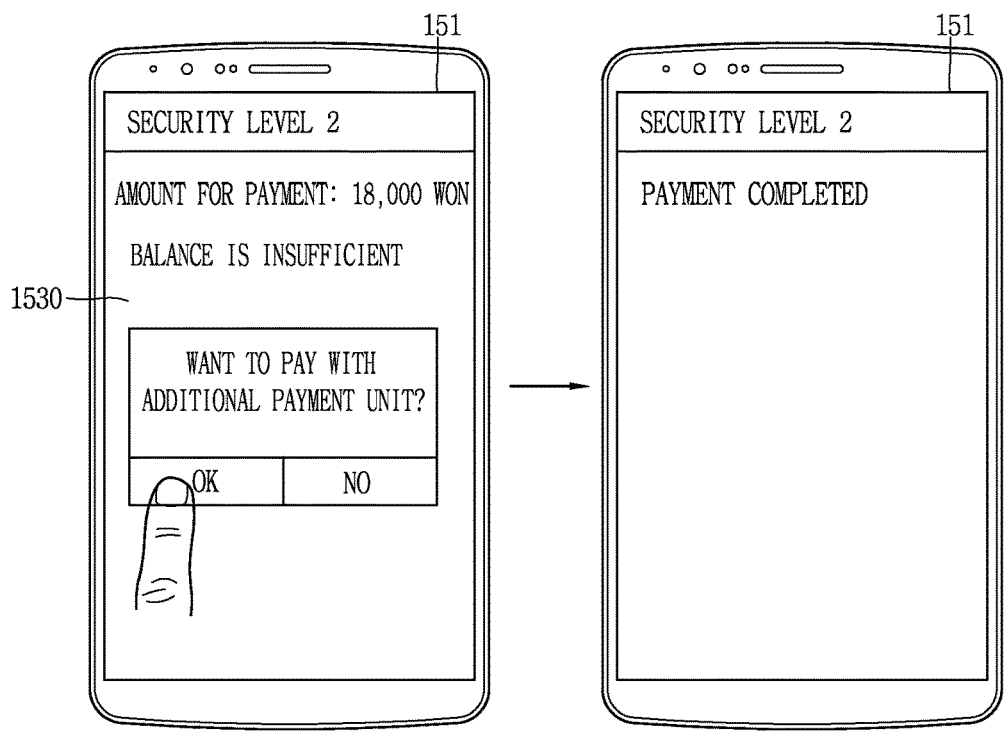
Figure 17C:
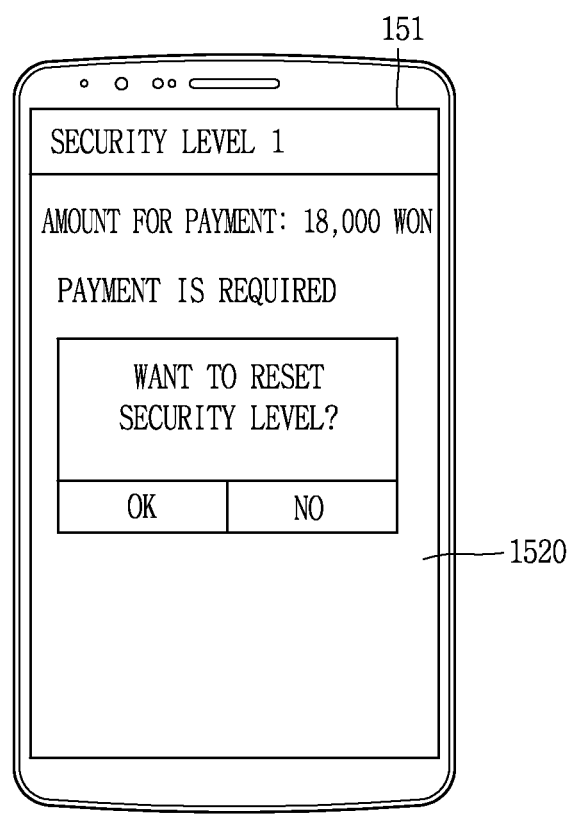

FIGS. 17A, 17B, and 17C are conceptual views illustrating a method for making payment related to a vehicle by a mobile terminal which has acquired authority to drive a vehicle.

The mobile terminal according to an exemplary embodiment may obtain authority to drive the vehicle and execute a function related to the vehicle.

Here, when payment request information is received from the vehicle, the control unit 180 may perform payment according to a security level. For example, as illustrated in FIG. 17A, in a case in which the mobile terminal has been set to have the second security level, when payment request information is received, the control unit 180 may execute a payment function. Also, when the payment is performed, the control unit 180 may output notification information 1510 indicating that the payment function has been executed, on the display unit 151.

In a case in which payment cannot be performed on the basis of the payment request information, the control unit 180 may perform payment through an additional payment unit.

For example, as illustrated in FIG. 17B, in a case in which the payment function cannot be executed on the basis of the payment request information, the control unit 180 may output information 1530 regarding an additional payment unit on the display unit 151. The case in which the payment function cannot be executed may refer to a case in which payment cannot be performed on the basis of information set as a payment unit. For example, it may be a case in which balance information included in the information set as the payment unit may be smaller than a payment amount.

The additional payment unit may be a different payment unit previously stored in the mobile terminal. The additional payment unit may be designated in the mobile terminal in advance. For example, the control unit 180 may set a first payment unit and a second payment unit in the mobile terminal in advance. The control unit 180 may set the first and second payment units such that the second payment unit is used when the first payment unit cannot be used.

As illustrated in FIG. 17B, in a case in which payment is performed by the additional payment unit, the control unit 180 may display notification information indicating that payment is performed, on the display unit 151.

Also, in a case in which the mobile terminal has been set to have a security level with which payment function cannot be performed, the control unit 180 may change the setting of the security level.

For example, as illustrated in FIG. 17C, in a case in which the mobile terminal has been set to have the fourth security level, the control unit 180 may not perform a payment function. That is, in the fourth security level, execution of the payment function may be limited.

In this case, the control unit 180 may display notification information 1520 indicating as to whether to change to a security level with which the payment function can be executed, on the display unit 151. For example, referring to FIG. 17C, the control unit 180 may output the notification information 1520 inquiring whether to change to a security level with which the payment function can be performed, on the display unit 151.

In this case, the control unit 180 may change the security level on the basis of a user request, or may not execute the payment function without changing the security level.

Descriptions of changing of the security level will be replaced with the scheme described above.

Meanwhile, the watch type terminal 300 may have security level set not to execute the payment function on the basis of payment request information for the purpose of vehicle security.

Here, as illustrated in FIG. 17C, in a case in which a user request for executing the payment function is received, the watch type terminal 300 may display notification information indicating that execution of the payment function is limited, on the display unit 351. Also, the notification information may include information regarding the mobile terminal available for execution of the payment function.

On the basis of the user request, the watch type terminal 300 may transmit the payment request information to the mobile terminal available for execution of the payment function. Here the mobile terminal may be a preset mobile terminal which may be positioned together with the watch type terminal 300 within the vehicle, or which may be positioned outside (for example, home) of the vehicle.

For example, referring to FIG. 17C, the watch type terminal 300 may transmit payment request information to the mobile terminal available for performing the payment function. Here, the control unit 180 of the mobile terminal may perform the payment function on the basis of the payment request information. Thus, the user may perform the payment function related to the vehicle even though the mobile terminal is not positioned within the vehicle.

Hereinbefore, the method for performing a function related to payment of the vehicle has been described. Hereinafter, a method for providing information related to a vehicle to the user through the watch type terminal will be described.

Figure 18A:
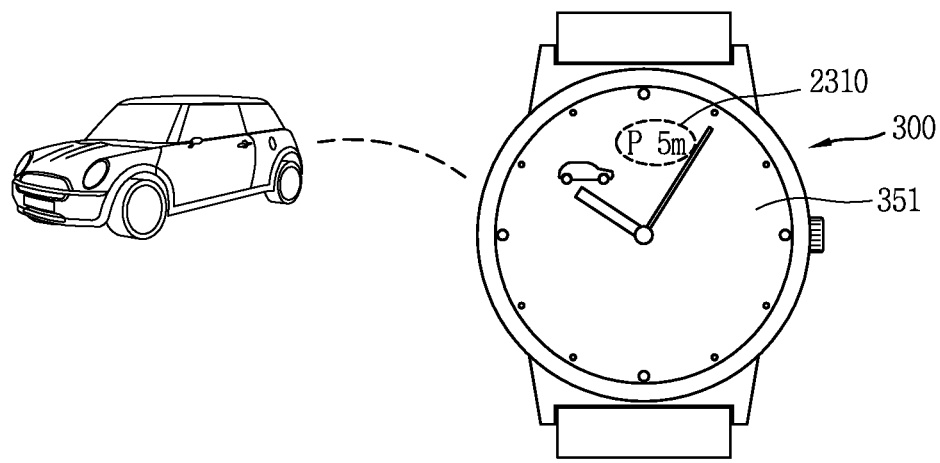
FIGS. 18A, 18B, and 18C are conceptual views illustrating a method for providing information related to a vehicle through a watch type terminal.
Figure 18B:
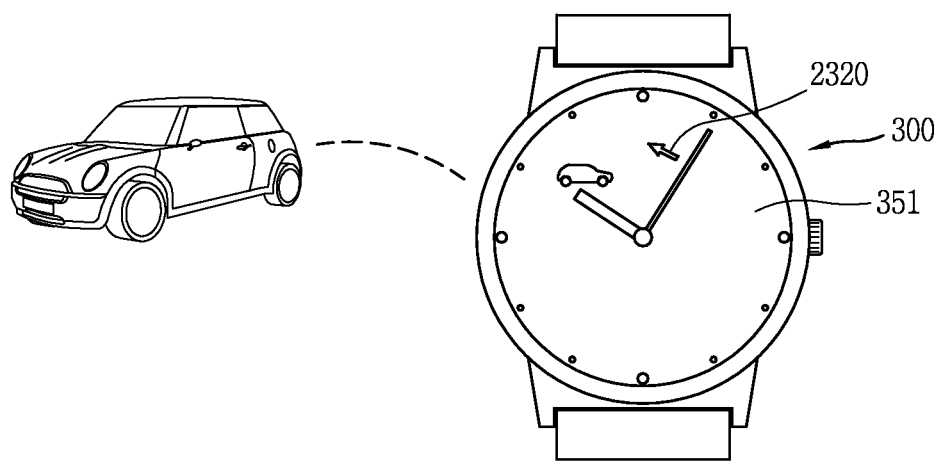
Figure 18C:
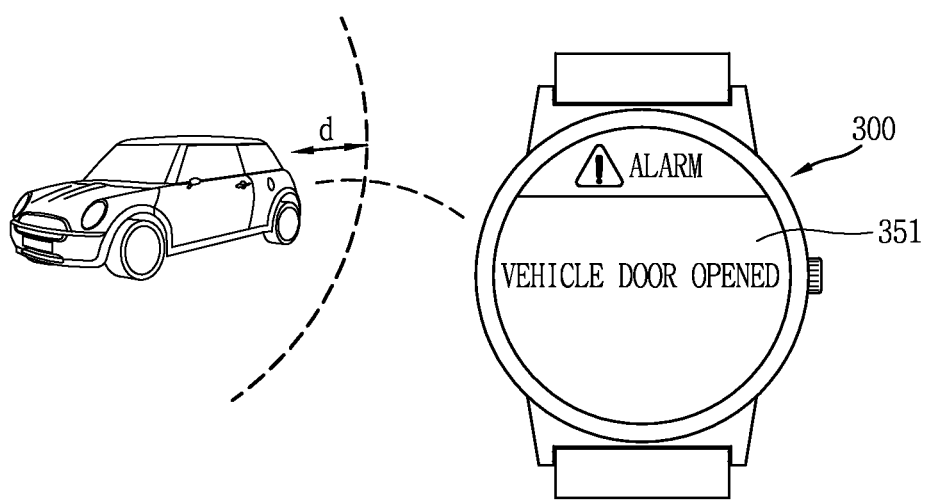

FIGS. 18A, 18B, and 18C are conceptual views illustrating a method for providing information related to a vehicle through a watch type terminal.

The watch type terminal 300 according to an exemplary embodiment of the present disclosure may be a watch type terminal authenticated (or registered) to perform control related to a vehicle through the mobile terminal authenticated by the vehicle or may be a watch type terminal directly authenticated (or registered) by the vehicle.

Here, the watch type terminal 300 may perform short range communication with the vehicle. For example, in a case in which the vehicle is sensed within a preset radius, the watch type terminal 300 may perform Bluetooth communication with the vehicle.

Meanwhile, the watch type terminal 300 may calculate a relative location between the watch type terminal 300 and the vehicle through Bluetooth communication. For example, on the basis of an angle at which a signal is received and signal strength, the watch type terminal 300 may calculate a relative location between the watch type terminal 300 and the vehicle.

Here, the watch type terminal 300 may output the calculated relative location to the display unit 351 thereof. For example, as illustrated in FIG. 18A, a relative distance between the vehicle and the watch type terminal 300 and state information of the vehicle (for example, a parked state) 2310 may be output on the display unit 351 of the watch type terminal 300. Also, in a case in which the relative distance between the vehicle and the watch type terminal 300 is shorter than a preset distance, the watch type terminal 300 may make the relative distance and the state information of the vehicle disappear from the display unit 351. Thus, in an exemplary embodiment of the present disclosure, in a case in which the watch type terminal 300 is so close to the vehicle that there is no need to view the distance between the watch type terminal 300 and the vehicle, the watch type terminal 300 may not provide the distance therebetween even without a separate control command from the user.

In another example, as illustrated in FIG. 18B, a graphic object 2320 representing a direction in which the vehicle is located with respect to the current location of the watch type terminal 300 may be output on the display unit 351 of the watch type terminal 300.

In another example, in a case in which the watch type terminal 300 is away from the vehicle by a distance equal to or greater than a preset distance d and the vehicle satisfies a preset condition, the watch type terminal 300 may output notification information. The preset condition may be a condition related to state information of the vehicle (for example, an opening and closing state of a door of the vehicle). The notification information may be output in any one of visual, audible, and tactile manner.

For example, as illustrated in FIG. 18C, in a case in which the watch type terminal 300 is away from the vehicle by a distance equal to or greater than the preset distance d and information indicating that a door is opened is received from the vehicle, the watch type terminal 300 may provide information indicating that the door of the vehicle is opened on the display unit 351.

Hereinafter, a method for performing a function related to a vehicle in a mobile terminal will be described.

Figure 19:
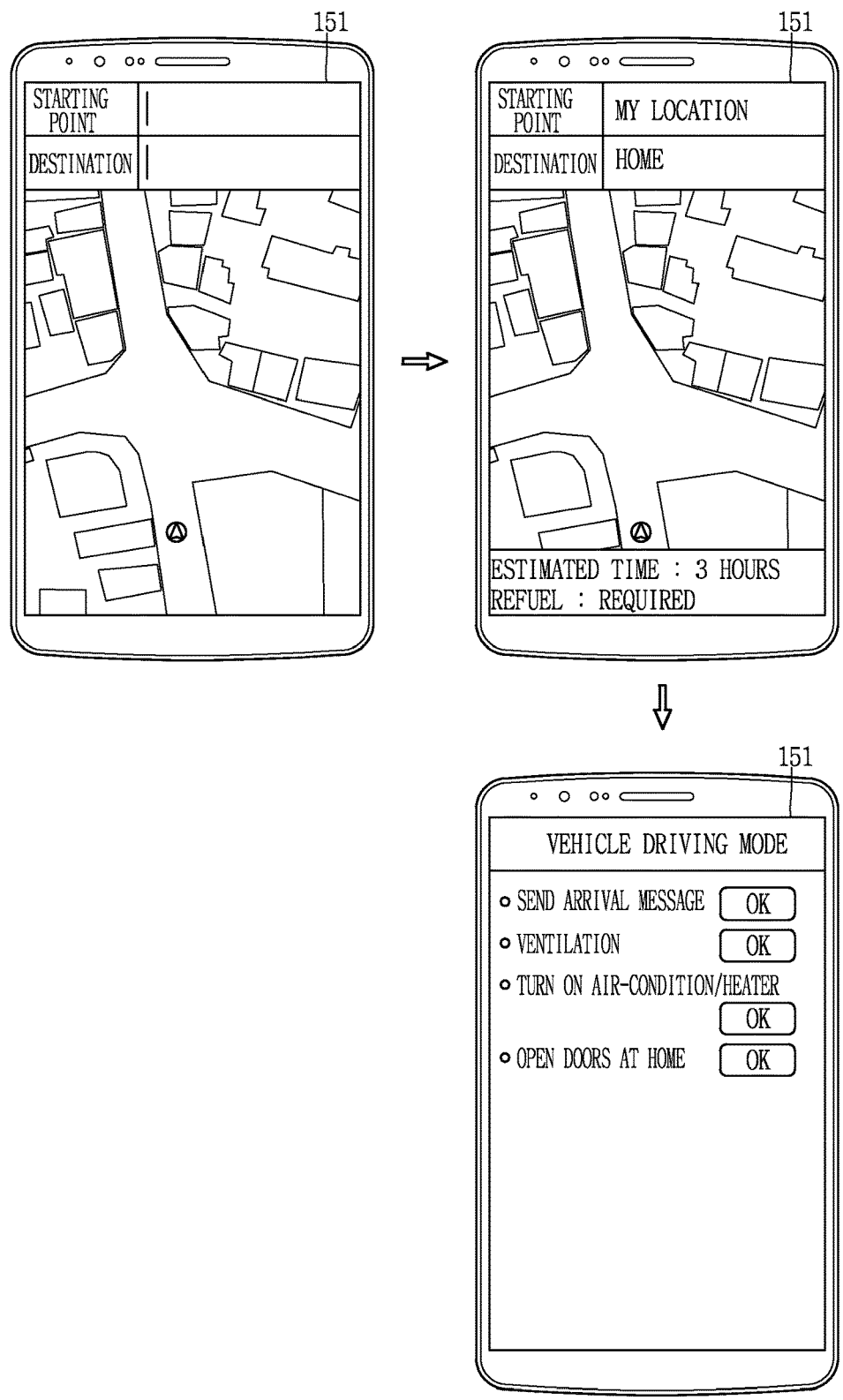
FIG. 19 includes conceptual views illustrating a method for performing a function related to a vehicle by using a mobile terminal.

FIG. 19 includes conceptual views illustrating a method for performing a function related to a vehicle by using a mobile terminal.

The mobile terminal according to an exemplary embodiment of the present disclosure may control a vehicle through communication with the vehicle. Here, the control unit 180 of the mobile terminal may receive state information from the vehicle and display the received status information of the vehicle on the display unit 151.

For example, as illustrated in the first and second drawings of FIG. 19, the control unit 180 may receive information regarding an amount of fuel, while a road guidance function is being executed. Here, in a case in which the amount of fuel is equal to or smaller than a preset amount, the control unit 180 may provide a location of a gas station located near the vehicle.

In addition, the control unit 180 may execute a preset function on the basis of a relative distance between the current location of the vehicle and a location of a destination. The preset function may be set according to a user selection or may be determined according to usage frequency of the user. For example, the preset function may be a function frequently used by the user through the mobile terminal in the location corresponding to the destination.

For example, as illustrated in FIG. 19, in a case in which the relative distance between the current location of the vehicle and the location of the destination is shorter than a preset distance, the control unit 180 may automatically execute a function of automatically sending an arrival message to an external device, a function of turning on or off an air-conditioner or a heater, or a function of automatically opening and closing a window.

Also, the control unit 180 may execute a vehicle call function. For example, when the vehicle call function is executed on the basis of a user request, the control unit 180 may transmit current location information of the mobile terminal to the vehicle. Here, the location information of the terminal may be detected through a GPS module or a Wi-Fi location measurement module. Also, the vehicle may be a vehicle able to perform data communication (for example, LTE0 with the mobile terminal.

Also, the control unit 180 may calculate a relative location between the vehicle and the mobile terminal through transmission and reception information of signals between the mobile terminal and the vehicle. In detail, the control unit 180 may calculate a relative distance and relative direction between the vehicle and the mobile terminal on the basis of an angle of a signal received by the mobile terminal from the vehicle and signal strength, and calculate a relative location of the mobile terminal with respect to the vehicle on the basis of the calculated relative distance and relative direction.

In this case, the vehicle may be moved to the current location through autonomous driving on the basis of the current location information of the mobile terminal. That is, in this manner, the user may get on the vehicle in the current location where he or she is present, without having to directly approach the vehicle.

So far, the method for controlling a vehicle through the mobile terminal has been described.

According to an exemplary embodiment of the present disclosure, by installing an authentication unit for performing key authentication for driving a vehicle on the rear cover (or the rear case) provided in the mobile terminal, a vehicle may be controlled without a separate key device.

Also, according to an exemplary embodiment of the present disclosure, by setting a security level of a vehicle by using various wearable devices, the vehicle may be controlled according to security levels of the devices.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the control unit 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a main body having a front side, a lateral side, and a rear side;
   a cover configured to be detachably coupled to the main body and configured to cover at least a portion of the front side, the lateral side, or the rear side of the main body;
   a vehicle authenticating unit disposed on the cover;
   a power supply unit configured to supply power to the main body and the vehicle authenticating unit; and
   a control unit configured to cause the power supply unit to supply power to the vehicle authenticating unit;
   wherein the vehicle authenticating unit is configured to transmit authentication information to a vehicle to perform authentication after receiving power from the power supply unit, and
   wherein the control unit is further configured to limit execution of a function installed at the mobile terminal when an amount of power remaining in the power supply unit is less than or equal to a preset amount of power to conserve power for supplying power to the vehicle authenticating unit.

2. The mobile terminal of claim 1, wherein the cover comprises an auxiliary power supply unit configured to supply power to the vehicle authenticating unit.

3. The mobile terminal of claim 2, wherein the control unit is configured to cause the auxiliary power supply unit to supply power to the vehicle authenticating unit when power of the power supply unit is less than or equal to a threshold amount.

4. The mobile terminal of claim 1, wherein the cover comprises an opening defining a receiving space configured to receive a physical key.

5. The mobile terminal of claim 1, wherein the vehicle authenticating unit is disposed at a side of the cover facing the main body.

6. A watch type terminal comprising:
   a main body comprising a display;
   a band configured to be detachably coupled to the main body;
   a vehicle authenticating unit disposed at the band;
   a power supply configured to supply power to the main body and the vehicle authenticating unit; and
   a control unit configured to cause the power supply to supply power to the vehicle authenticating unit;
   wherein the vehicle authenticating unit is configured to transmit first authentication information to a vehicle to perform authentication after receiving power from the power supply unit;
   wherein the control unit is further configured to limit execution of a function installed at the watch type terminal when an amount of power remaining in the power supply unit is less than or equal to a preset amount of power to conserve power for supplying power to the vehicle authenticating unit.

7. The watch type terminal of claim 6, further comprising a plurality of connection terminals configured to provide power from the power supply unit.

8. The watch type terminal of claim 6, wherein the control unit is further configured to cause the vehicle authenticating unit to transmit the first authentication information to the vehicle for key authentication when power is supplied to the vehicle authenticating unit.

9. The watch type terminal of claim 8, wherein the control unit is further configured to cause transmission of second authentication information to the vehicle for dual authentication, wherein the second authentication information is different from the first authentication information.

* * * * *